(12) United States Patent
Waddell et al.

(10) Patent No.: US 7,659,355 B2
(45) Date of Patent: Feb. 9, 2010

(54) ELASTOMERIC COMPOSITIONS, AIR BARRIERS, AND PROCESSES FOR THE MAKING THE SAME

(75) Inventors: Walter Harvey Waddell, Pasadena, TX (US); David Yen-Lung Chung, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 334 days.

(21) Appl. No.: 11/628,591

(22) PCT Filed: Jun. 13, 2005

(86) PCT No.: PCT/US2005/020864

§ 371 (c)(1),
(2), (4) Date: Dec. 5, 2006

(87) PCT Pub. No.: WO2006/002033

PCT Pub. Date: Jan. 5, 2006

(65) Prior Publication Data

US 2008/0015307 A1    Jan. 17, 2008

Related U.S. Application Data

(60) Provisional application No. 60/579,617, filed on Jun. 15, 2004.

(51) Int. Cl.
| C08F 36/00 | (2006.01) |
| C08F 136/00 | (2006.01) |
| C08F 236/00 | (2006.01) |
| C08F 2/00 | (2006.01) |
| C08F 4/12 | (2006.01) |
| C08L 9/00 | (2006.01) |
| A61K 8/81 | (2006.01) |
| C08K 3/34 | (2006.01) |
| C08K 3/18 | (2006.01) |
| C08K 3/22 | (2006.01) |

(52) U.S. Cl. .................. 526/335; 526/339; 526/206; 526/226; 526/90; 525/232; 525/332.3; 525/332.8; 524/280; 524/445; 524/493; 524/430; 152/DIG. 16

(58) Field of Classification Search .............. 526/348.7, 526/339, 335, 206, 226, 90; 525/232, 332.3, 525/332.8
See application file for complete search history.

(56) References Cited

U.S. PATENT DOCUMENTS

| 2,534,698 | A |   | 12/1950 | Calfee et al. ............. 260/85.3 |
| 2,548,415 | A |   | 4/1951 | Welch et al. |
| 2,644,809 | A |   | 7/1953 | Saylor ..................... 260/85.3 |
| 3,470,143 | A |   | 9/1969 | Schrage et al. ............ 260/82.5 |
| 4,107,417 | A | * | 8/1978 | Priola et al. ................ 526/117 |
| 5,182,333 | A | * | 1/1993 | Powers et al. .............. 525/315 |
| 5,417,930 | A |   | 5/1995 | McDonald, Jr. et al. ..... 422/131 |
| 5,527,870 | A |   | 6/1996 | Maeda et al. ............. 526/348.7 |
| 5,624,878 | A |   | 4/1997 | Devore et al. ............... 502/152 |
| 6,156,859 | A | * | 12/2000 | Langstein et al. ........... 526/226 |
| 6,710,116 | B1 |   | 3/2004 | Waddell et al. ............. 524/515 |
| 7,332,554 | B2 | * | 2/2008 | Shaffer et al. .............. 526/335 |
| 7,332,555 | B2 | * | 2/2008 | Shaffer et al. .............. 526/335 |
| 7,491,773 | B2 | * | 2/2009 | Shaffer et al. ............. 525/332.3 |
| 7,582,715 | B2 | * | 9/2009 | Milner et al. ............... 526/335 |
| 2002/0111414 | A1 | * | 8/2002 | Langstein et al. ........... 524/495 |
| 2003/0150504 | A1 |   | 8/2003 | Simon et al. ................ 138/149 |
| 2003/0187173 | A1 |   | 10/2003 | Kaszas ...................... 526/339 |
| 2004/0106735 | A1 |   | 6/2004 | Tsou et al. .................. 525/191 |
| 2006/0094847 | A1 | * | 5/2006 | Milner et al. ............... 526/335 |

FOREIGN PATENT DOCUMENTS

| DE | 10061727 | 6/2002 |
| EP | 0320263 | 3/1996 |
| WO | WO 00/04061 | 1/2000 |
| WO | WO 02/32992 | 4/2002 |
| WO | WO 02/32993 | 4/2002 |
| WO | WO 02/34794 | 5/2002 |
| WO | WO 02/096964 | 12/2002 |

OTHER PUBLICATIONS

Webb, R.N. et al. "Butyl Rubber." Encyclopedia of Polymer Science and Technology. Ed. Herman Mark. John Wiley & Sons, Oct. 21, 2004, article available online Apr. 15, 2003.*
Carbocationic Polymerization, J.P. Kennedy, E. Marechal, Wiley-Interscience, New York, 1982, pp. 318-319.
Cationic Polymerization of Olefins: A Critical Inventory, J.P. Kennedy, Wiley Interscience, New York, pp. 10-13, 86-137 (1975).
Chemical Microstructure of Polymer Chains, J.L. Koenig, Wiley-Interscience, entitled "Determination of Structure-Property Relations in Polymers", pp. 1-8, New York, (1980).
Gyor et al., J. Macromol. Sci.-Pure Appl. Chem. A31(12), entitled Polyisobutylene-Based Thermoplastic Elastomers. I. Synthesis and Characterization of Polystyrene-Polyisobutylene-Polystyrene Triblock Copolymers, pp. 2055-2065, Massachusetts, 1994.
H. C. Wang et al., Elastomerics, entitled "Functionalized PMS/IB Copolymers Offer Wide Range of Properties", (1992).
I. Orszagh et al., J. Phys. Org. Chem., vol. 8, entitled "Living Carbocationic Copolymerizations. I. Synthesis and Characterization of Isobutylene/p-Methystyrene Copolymers", Ohio, pp. 258-272, 1995.
J.E. Puskas, Encyclopedia of Polymer Science and Technology, "Carbocationic Polymerizations" John Wiley & Sons, New York, (2003).

(Continued)

*Primary Examiner*—Vasu Jagannathan
*Assistant Examiner*—Anthony H Sheh
(74) *Attorney, Agent, or Firm*—Xiaobing Feng; Leandro Arechederra

(57) ABSTRACT

The invention relates to novel air barriers made from elastomeric compositions. In particular, the invention relates to novel air barriers such as innerliners, air sleeves, and innertubes made from novel $C_4$ to $C_7$ isoolefin based polymers with new sequence distributions or that are substantially free of long chain branching.

31 Claims, No Drawings

OTHER PUBLICATIONS

K. Matyjaszewski, ed. Cationic Polymerization, Marcel Dekker, Inc., New York, (1996).

Organic Chemistry, Sixth Edition, Morrison and Boyd, Prentice-Hall, entitled "Ionic Polymerization. Living Polymers", pp. 1084-1085, (Englewood Cliffs New Jersey) 1992.

Polymer Sequence Determination: Carbon-13 NMR Method, entitled "A Survey of Carbon-13 NMR Studies of Vinyl Homopolymers and Copolymers" J.C. Randall, Academic Press, 1977, New York, pp. 103-146.

W.A. Thaler et al., entitled "High Molecular-Weight, High Unsaturation Copolymers of Isobutylene and Conjugated Dienes", 49(4) Rubber Chemical Technology, 960 (1976).

* cited by examiner

ELASTOMERIC COMPOSITIONS, AIR BARRIERS, AND PROCESSES FOR THE MAKING THE SAME

CROSS REFERENCE TO RELATED APPLICATIONS

This application is a 371 National Stage Application of International Application No. PCT/US2005/020864, filed Jun. 13, 2005, which claims the benefit of 60/579,617, filed Jun. 15, 2004, the disclosures of which are herein incorporated by reference in their entireties.

FIELD OF THE INVENTION

The invention relates to novel air barriers made from elastomeric compositions. In particular, the invention relates to novel air barriers such as innerliners, air sleeves, and innertubes made from novel $C_4$ to $C_7$ isoolefin based polymers with new sequence distributions or that are substantially free of long chain branching.

BACKGROUND

Halobutyl rubbers, which are isobutylene-based copolymers of $C_4$ to $C_7$ isoolefins and a multiolefins, are the polymers of choice for best air-retention for air barriers in tires for passenger, truck, bus and aircraft vehicles. Bromobutyl rubber, chlorobutyl rubber, Exxpro™ polymers (avaliable for ExxonMobil Chemical Co., Baytown, Tex.), and halogenated star-branched butyl rubbers can be formulated for such applications depending on the desired properties for the end use application.

These polymers are generally prepared in carbocationic polymerization processes. The carbocationic polymerization of isobutylene and its copolymerization with comonomers like isoprene is mechanistically complex. See, e.g., *Organic Chemistry*, SIXTH EDITION, Morrison and Boyd, Prentice-Hall, 1084-1085, Englewood Cliffs, N.J. 1992, and K. Matyjaszewski, ed, *Cationic Polymerizations*, Marcel Dekker, Inc., New York, 1996. The catalyst system is typically composed of two components: an initiator and a Lewis acid. Examples of Lewis acids include $AlCl_3$ and $BF_3$. Examples of initiators include Brønsted acids such as HCl, RCOOH (wherein R is an alkyl group), and $H_2O$. During the polymerization process, in what is generally referred to as the initiation step, isobutylene reacts with the Lewis acid/initiator pair to produce a carbenium ion. Following, additional monomer units add to the formed carbenium ion in what is generally called the propagation step. These steps typically take place in a diluent or solvent. Temperature, diluent polarity, and counterions affect the chemistry of propagation. Of these, the diluent is typically considered important.

Industry has generally accepted widespread use of a slurry polymerization process (to produce butyl rubber, polyisobutylene, etc.) in the diluent methyl chloride. Typically, the polymerization process extensively uses methyl chloride at low temperatures, generally lower than −90° C., as the diluent for the reaction mixture. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of approximately 26% to 37% by volume in the reaction mixture can be achieved, as opposed to the concentration of only about 8% to 12% in solution polymerization. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers. Likewise polymerizations of isobutylene and para-methylstyrene are also conducted using methyl chloride. Similarly, star-branched butyl rubber is also produced using methyl chloride.

However, there are a number of problems associated with the polymerization in methyl chloride, for example, the tendency of the polymer particles in the reactor to agglomerate with each other and to collect on the reactor wall, heat transfer surfaces, impeller(s), and the agitator(s)/pump(s). The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained.

The commercial reactors typically used to make these rubbers are well mixed vessels of greater than 10 to 30 liters in volume with a high circulation rate provided by a pump impeller. The polymerization and the pump both generate heat and, in order to keep the slurry cold, the reaction system needs to have the ability to remove the heat. An example of such a continuous flow stirred tank reactor ("CFSTR") is found in U.S. Pat. No. 5,417,930, incorporated by reference, hereinafter referred to in general as a "reactor" or "butyl reactor". In these reactors, slurry is circulated through tubes of a heat exchanger by a pump, while boiling ethylene on the shell side provides cooling, the slurry temperature being determined by the boiling ethylene temperature, the required heat flux and the overall resistance to heat transfer. On the slurry side, the heat exchanger surfaces progressively accumulate polymer, inhibiting heat transfer, which would tend to cause the slurry temperature to rise. This often limits the practical slurry concentration that can be used in most reactors from 26 to 37 volume % relative to the total volume of the slurry, diluent, and unreacted monomers. The subject of polymer accumulation has been addressed in several patents (such as U.S. Pat. No. 2,534,698, U.S. Pat. No. 2,548,415, U.S. Pat. No. 2,644,809). However, these patents have unsatisfactorily addressed the myriad of problems associated with polymer particle agglomeration for implementing a desired commercial process.

U.S. Pat. No. 2,534,698 discloses, inter alia, a polymerization process comprising the steps in combination of dispersing a mixture of isobutylene and a polyolefin having 4 to 14 carbon atoms per molecule, into a body of a fluorine substituted aliphatic hydrocarbon containing material without substantial solution therein, in the proportion of from one-half part to 10 parts of fluorine substituted aliphatic hydrocarbon having from one to five carbon atoms per molecule which is liquid at the polymerization temperature and polymerizing the dispersed mixture of isobutylene and polyolefin having four to fourteen carbon atoms per molecule at temperatures between −20° C. and −164° C. by the application thereto a Friedel-Crafts catalyst. However, '698 teaches that the suitable fluorocarbons would result in a biphasic system with the monomer, comonomer and catalyst being substantially insoluble in the fluorocarbon making their use difficult and unsatisfactory.

U.S. Pat. No. 2,548,415 discloses, inter alia, a continuous polymerization process for the preparation of a copolymer, the steps comprising continuously delivering to a polymerization reactors a stream consisting of a major proportion of isobutylene and a minor proportion isoprene; diluting the mixture with from ½ volume to 10 volumes of ethylidene difluoride; copolymerizing the mixture of isobutylene isoprene by the continuous addition to the reaction mixture of a liquid stream of previously prepared polymerization catalyst consisting of boron trifluoride in solution in ethylidene difluoride, maintaining the temperature between −40° C. and −103° C. throughout the entire copolymerization reaction . . . '415 teaches the use of boron trifluoride and its complexes as the Lewis acid catalyst and 1,1-difluoroethane as a preferred combination. This combination provides a system in which the catalyst, monomer and comonomer are all soluble and yet still affords a high degree of polymer insolubility to capture the benefits of reduced reactor fouling. However, boron trifluoride is not a preferred commercial catalyst for butyl polymers for a variety of reasons.

U.S. Pat. No. 2,644,809 teaches, inter alia, a polymerization process comprising the steps in combination of mixing together a major proportion of a monoolefin having 4 to 8, inclusive, carbon atoms per molecule, with a minor proportion of a multiolefin having from 4 to 14, inclusive, carbon atoms per molecule, and polymerizing the resulting mixture with a dissolved Friedel-Crafts catalyst, in the presence of from 1 to 10 volumes (computed upon the mixed olefins) of a liquid selected from the group consisting of dichlorodifluoromethane, dichloromethane, trichloromonofluormethane, dichloromonofluormethane, dichlorotetrafluorethane, and mixtures thereof, the monoolefin and multiolefin being dissolved in said liquid, and carrying out the polymerization at a temperature between −20 oC and the freezing point of the liquid. '809 discloses the utility of chlorofluorocarbons at maintaining ideal slurry characteristics and minimizing reactor fouling, but teaches the incorporation of diolefin (i.e. isoprene) by the addition of chlorofluorocarbons (CFC). CFC's are known to be ozone-depleting chemicals. Governmental regulations, however, tightly controls the manufacture and distribution of CFC's making these materials unattractive for commercial operation.

Additionally, Thaler, W. A., Buckley, Sr., D. J., *High Molecular-Weight, High Unsaturation Copolymers of Isobutylene and Conjugated Dienes,* 49(4) Rubber Chemical Technology, 960 (1976), discloses, inter alia, the cationic slurry polymerization of copolymers of isobutylene with isoprene (butyl rubber) and with cyclopentadiene in heptane.

Therefore, finding alternative diluents or blends of diluents to create new polymerization systems that would reduce particle agglomeration and/or reduce the amount of chlorinated hydrocarbons such as methyl chloride is desirable. Additionally, finding new polymers associated with the aforementioned processes would help supply the world's increasing demand for elastomers and/or also provide for new end use applications.

Hydrofluorocarbons (HFC's) are of interest because they are chemicals that are currently used as environmentally friendly refrigerants because they have a very low (even zero) ozone depletion potential. Their low ozone depletion potential is thought to be related to the lack of chlorine. The HFC's also typically have low flammability particularly as compared to hydrocarbons and chlorinated hydrocarbons. The use of such chemicals in the aforementioned polymerization processes is of importance.

For example, long chain branching is known to influence the solution and rheological properties of polymers. Isobutylene/isoprene copolymers are known to possess slight amounts of long chain branching. The degree of long chain branching generally increases with the level of isoprene in the copolymer. Because of the direct relationship between branching and isoprene incorporation, matching the rheological behavior of isobutylene/isoprene copolymers with higher amounts of isoprene to those with less may not be straightforward.

Furthermore, isobutylene/isoprene copolymerizations have been conducted under a variety of polymerizations conditions including different monomer feed ratios, temperatures, catalysts, and solvents or diluents. A number of these systems have been described. See e.g. *Cationic Polymerizations of Olefins: A Critical Inventory*, J. P. Kennedy, (10-12 and 86-137) Wiley-Interscience, New York, 1972, and *Carbocationic Polymerization*, J. P. Kennedy, E. Marechal, Wiley-Interscience, New York, 1982.

The copolymerization of isobutylene and isoprene has been conducted in solution and in slurry. Solution polymerizations often employ chlorinated hydrocarbons or mixtures of hydrocarbons and chlorinated hydrocarbons to serve as a solvent for the monomers, catalyst and the prepared copolymers. A typical example is ethyl chloride/hexane mixtures. In slurry copolymerization, a chlorinated hydrocarbon, usually methyl chloride, is used as a solvent for the monomers and catalyst, but the copolymer produced is insoluble in the diluent.

The sequence distribution, characterization of the arrangement of the monomer units along polymer chain, of the prepared copolymers is influenced by the polymerization conditions as well as the intrinsic reactivity of the comonomers employed. The sequence distribution of a copolymer may be expressed in terms of combinations of adjacent structural units. For example, characterizable sequences of two monomer units are called diads. Three monomer unit sequences are called triads. Four monomer unit sequences are called tetrads and so forth. Copolymers prepared under different conditions with the same comonomer incorporation may exhibit differences in their sequence distributions as expressed by the diad (or triad, etc.) fractions in the copolymer chain. Sequence distributions and comonomer incorporation are mathematically linked by probability statistics because of the competitive nature of the chemical events involved in copolymerization. A parameter that aids in the characterization of this relationship is the reactivity ratio, a ratio of the rate constants of homopropagation (adding a like monomer) to cross propagation (adding an unlike monomer). Copolymers with the same comonomer incorporation, but with different sequence distributions often exhibit different physical properties. See e.g. *Chemical Microstructure of Polymer Chains*, J. L. Koenig, Wiley-Interscience, New York, 1980, and *Polymer Sequence Determination: Carbon-13 NMR Method*, J. C. Randall, Academic Press, 1977. An extreme, but clarifying example is the comparison of the physical attributes of random and block copolymers.

It is generally known that conjugated dienes are less reactive than isobutylene in carbocationic copolymerization systems. Of the known linear conjugated dienes, isoprene is one of the more reactive dienes in copolymerization with isobutylene. This tendency towards lower reactivity of the conjugated diene is expressed in the sequence distribution of the prepared copolymers. At a given copolymer composition, isoprene units do not exhibit a tendency to follow other isoprene units in the copolymer chain. Consequently, BII (B=isobutylene, I=isoprene), IIB and III triad fractions are relatively low than compared to systems with more reactive comonomers.

Because isobutylene/isoprene copolymerizations are often conducted in chlorinated hydrocarbons or mixtures of hydrocarbons and chlorinated hydrocarbons, the degree to which the sequence distribution can be varied is quite limited. Expression of this limitation is found by examination of the known reactivity ratios of isoprene for isobutylene/isoprene copolymerizations See e.g., J. E. Puskas, "Carbocationic Polymerizations" in *Encyclopedia of Polymer Science and Technology*, (DOI: 10.1002/0471440264.pst040) John Wiley & Sons, New York, 2003. Values for isoprene reactivity ratios, $r_{IP}$, under a variety of polymerization conditions fall below 1.4 indicating a narrow range of available isoprene centered triad fractions (BII, IIB and III) in the prepared copolymers. Finding a polymerization system in which different concentrations of isoprene centered triad fraction can be prepared at a given comonomer incorporation is desirable for preparing copolymers suitable for the simultaneous introduction of crosslinking sites and functional groups.

Similarly, isobutylene/p-methylstyrene copolymerizations have been conducted under a variety of polymerization conditions including different monomer feed ratios, temperatures, catalysts, and solvents or diluents. A number of these systems have been described. See e.g. H.-C. Wang, K. W. Powers in Elastomerics 1992, January, 14; Z. Fodor, R. Faust in J. Macromol. Sci.-Pure Appl. Chem. 1994, A31, 1985; I. Orszagh, A. Nagy, J. P. Kennedy, J. Phys. Org. Chem. 1995, 8, 258.

The copolymerization of isobutylene and p-methylstyrene has been conducted in solution and in slurry. Solution polymerizations often employ chlorinated hydrocarbons or mixtures of hydrocarbons and chlorinated hydrocarbons to serve as a solvent for the monomers, catalyst and the prepared copolymers. A typical example is methyl chloride/hexane mixtures. In slurry copolymerization, a chlorinated hydrocarbon, usually methyl chloride, is used as a solvent for the monomers and catalyst, but the copolymer produced is insoluble in the diluent.

The sequence distribution, i.e. characterization of the arrangement of the monomer units along polymer chain, of the prepared copolymers is influenced by the polymerization conditions as well as the intrinsic reactivity of the comonomers employed. The sequence distribution of a copolymer may be expressed in terms of combinations of adjacent structural units. For example, characterizable sequences of two monomer units are called diads. Three monomer unit sequences are called triads. Four monomer unit sequences are called tetrads and so forth. Copolymers prepared under different conditions with the same comonomer incorporation may exhibit differences in their sequence distributions as expressed by the diad (or triad, etc.) fractions in the copolymer chain. Sequence distributions and comonomer incorporation are mathematically linked by probability statistics because of the competitive nature of the chemical events involved in copolymerization. A parameter that aids in the characterization of this relationship is the reactivity ratio, a ratio of the rate constants of homopropagation (adding a like monomer) to cross propagation (adding an unlike monomer). Copolymers with the same comonomer incorporation, but with different sequence distributions often exhibit different physical properties. See e.g. *Chemical Microstructure of Polymer Chains*, J. L. Koenig, Wiley-Interscience, New York, 1980, and *Polymer Sequence Determination: Carbon*-13 *NMR Method*, J. C. Randall, Academic Press, 1977. An extreme, but clarifying example is the comparison of the physical attributes of random and block copolymers.

It is generally known that p-alkylstyrenes are more reactive than isobutylene in carbocationic copolymerization systems. Of the known linear p-alkylstyrenes, p-methylstyrene is the most widely used in copolymerization with isobutylene. The tendency towards higher reactivity of the p-alkylstyrene is expressed in the sequence distribution of the prepared copolymers. At a given copolymer composition, p-methylstyrene units exhibit a tendency to follow other p-methylstyrene units in the copolymer chain. Consequently, BSB (B=isobutylene, S=p-methylstyrene) triads are present at relatively lower concentrations than copolymerization systems in which the reactivity of the comonomers are more similar.

Because isobutylene/p-methylstyrene copolymerizations are often conducted in chlorinated hydrocarbons or mixtures of hydrocarbons and chlorinated hydrocarbons, the degree to which the sequence distribution can be varied is quite limited. Expression of this limitation is found by examination of the known reactivity ratios of p-methylstyrene for isobutylene/p-methylstyrene copolymerizations See e.g. H.-C. Wang, K. W. Powers in Elastomerics 1992, January, 14; Z. Fodor, R. Faust in J. Macromol. Sci.-Pure Appl. Chem. 1994, A31, 1985; I. Orszagh, A. Nagy, J. P. Kennedy, J. Phys. Org. Chem. 1995, 8, 258. Finding a polymerization system in which p-alkylstyrene centered triad fractions can be prepared which are different than those available using known copolymerization conditions is desirable. Copolymers that possess higher concentrations of isoolefin-p-alkylstyrene-isoolefin triad fractions are useful for the preparation of materials that possess both crosslinking sites and functional groups.

Therefore, producing novel air barriers such as innerliners, air sleeves, and innertubes made from novel $C_4$ to $C_7$ isoolefin based polymers with new sequence distributions or that are substantially free of long chain branching is of importance.

Other background references include WO 02/32992, WO 02/32993, WO 02/34794, WO 02/096964, WO 00/04061, EP 0 320 263 A2, DE 100 61 727 A, U.S. Patent Application Publication No. 2003/150504, U.S. Patent Application Publication No. 2003/187173, U.S. Patent Application Publication No. 2004/106735, U.S. Pat. No. 6,710,116, U.S. Pat. No. 5,624,878, U.S. Pat. No. 5,527,870, and U.S. Pat. No. 3,470,143.

SUMMARY OF THE INVENTION

The invention provides for elastomeric compositions for air barriers such as innerliners, innertubes, and air sleeves made from novel polymers produced by new polymerization processes comprising diluents comprising hydrofluorocarbons.

a) In an aspect of the invention, the air barrier comprises a cured elastomeric composition comprising a polymer substantially free of long chain branching or having no long chain branching.

In particular, the invention provides for an air barrier comprising a cured elastomeric composition comprising a copolymer of an isoolefin, preferably isobutylene, and a multiolefin, preferably a conjugated diene, more preferably isoprene, substantially free of long chain branching. Additionally, the invention provides for an air barrier comprising a cured elastomeric composition comprising a copolymer of an isoolefin, preferably isobutylene, and a multiolefin, preferably a conjugated diene, more preferably isoprene, having no long chain branching.

In another aspect of the invention, the invention provides for an air barrier comprising a cured elastomeric composition comprising a copolymer produced by the process comprising contacting an isoolefin, preferably isobutylene, a multiolefin, preferably a conjugated diene, more preferably isoprene, one or more Lewis acid(s), one or more initiator(s), and a diluent comprising one or more hydrofluorocarbon(s) (HFC's); wherein the copolymer is substantially free of long chain branching or has no long chain branching.

In an embodiment, the multiolefin, or conjugated diene, or isoprene, when present, content is from greater than 0.5 mol %.

In an embodiment, the multiolefin, or conjugated diene, or isoprene, when present, content is from greater than 1.0 mol %.

In an embodiment, the multiolefin, or conjugated diene, or isoprene, when present, content is from greater than 2.5 mol %.

In an embodiment, the multiolefin, or conjugated diene, or isoprene, when present, content is from greater than 5.0 mol %.

In the previous embodiments, the copolymer may be halogenated to form a halogenated copolymer.

In the previous embodiment, the halogenated copolymer is halogenated with chlorine or bromine.

In any of the previous embodiments, the halogen content is greater than 0.5 wt % based upon the weight of the halogenated copolymer.

In any of the previous embodiments, the halogen content is from 0.5 wt % to 3.0 wt % based upon the weight of the halogenated copolymer.

In any of the previous embodiments, the copolymer may have a Mw of from greater than 50,000.

In any of the previous embodiments, the copolymer may have a Mw of from greater than 100,000.

In any of the previous embodiments, the copolymer may have a Mw of from greater than 500,000.

In any of the previous embodiments, the copolymer may have a Mw of from greater than 1,000,000.

In any of the previous embodiments, the copolymer may have a MWD of from greater than 2.

In any of the previous embodiments, the copolymer may have a MWD of from 2 to 6.

In any of the previous embodiments, the copolymer may have a Mooney viscosity of at least 20±5 (ML 1+8 at 125° C., ASTM D 1646).

In any of the previous embodiments, the copolymer may have a Mooney viscosity of from 20±5 to 60±5 (ML 1+8 at 125° C., ASTM D 1646).

In any of the previous embodiments, the copolymer may have a $g'_{vis.avg.}$ from greater than or equal to 0.978 as determined by triple detection SEC (described herein).

In any of the previous embodiments, the copolymer may have a $g'_{vis.avg.}$ from greater than or equal to 0.980 as determined by triple detection SEC (described herein).

In any of the previous embodiments, the copolymer may have a $g'_{vis.avg.}$ from greater than or equal to 0.990 as determined by triple detection SEC (described herein).

In any of the previous embodiments, the copolymer may have a $g'_{vis.avg.}$ from greater than or equal to 0.995 as determined by triple detection SEC (described herein).

In any of the previous embodiments, the copolymer may have no long chain branching.

b) In another aspect of the invention, the invention provides for an air barrier comprising a cured elastomeric composition comprising a copolymer comprising an isoolefin, preferably isobutylene, and a multiolefin, preferably a conjugated diene, more preferably isoprene, with new sequence distributions.

In an embodiment, the invention provides for an air barrier comprising a cured elastomeric composition comprising a copolymer comprising an isoolefin, preferably isobutylene, and a multiolefin, preferably a conjugated diene, preferably isoprene, the copolymer having a copolymer sequence distribution defined by:

$$F=mA/(1+mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from greater than 1.5.

In the previous embodiment, m may be from greater than 2.0.

In the previous embodiment, m may be from greater than 2.5.

In the previous embodiment, m may be from greater than 3.5.

In another embodiment, the invention provides for an air barrier comprising a cured elastomeric composition comprising a copolymer comprising an isoolefin, preferably isobutylene, and a multiolefin, preferably a conjugated diene, even more preferably isoprene, the copolymer having a copolymer sequence distribution defined by:

$$F=mA/(1+mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from 1.10 to 1.25.

In the previous embodiment, m may be from 1.15 to 1.20.

In the previous embodiment, m may be from 1.15 to 1.25.

In the previous embodiment, m may be about 1.20.

In another aspect of the invention, the invention provides for an air barrier comprising a cured elastomeric composition comprising a copolymer produced by the process comprising contacting an isoolefin, preferably isobutylene, a multiolefin, preferably a conjugated diene, even more preferably isoprene, one or more Lewis acid(s), one or more initiator(s), and a diluent comprising one or more hydrofluorocarbon(s) (HFC's); the copolymer having a copolymer sequence distribution defined by:

$$F=mA/(1+mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from greater than 1.5 or m is from 1.10 to 1.25.

In the previous embodiment, m may be from greater than 2.0.

In the previous embodiment, m may be from greater than 2.5.

In the previous embodiment, m may be from greater than 3.5.

In the previous embodiment, m may be from 1.15 to 1.20.

In the previous embodiment, m may be from 1.15 to 1.25.

In the previous embodiment, m may be m is about 1.20.

In any of the previous embodiments, the copolymer may be halogenated to form a halogenated copolymer.

In any of the previous embodiments, when present, the halogenated copolymer is halogenated with chlorine or bromine.

In any of the previous embodiments, when present, the halogen content is greater than 0.5 wt % based upon the weight of the halogenated copolymer.

In any of the previous embodiments, when present, the halogen content is from 0.5 wt % to 3.0 wt % based upon the weight of the halogenated copolymer.

In any of the previous embodiments, the copolymer has a Mw of from greater than 50,000.

In any of the previous embodiments, the copolymer has a Mw of from greater than 100,000.

In any of the previous embodiments, the copolymer has a Mw of from greater than 500,000.

In any of the previous embodiments, the copolymer has a Mw of from greater than 1,000,000.

In any of the previous embodiments, the copolymer has a MWD of from greater than 2.

In any of the previous embodiments, the copolymer has a MWD of from 2 to 6.

In any of the previous embodiments, the copolymer has a Mooney viscosity of at least 20±5 (ML 1+8 at 125° C., ASTM D 1646).

In any of the previous embodiments, the copolymer has a Mooney viscosity of from 20±5 to 60±5 (ML 1+8 at 125° C., ASTM D 1646).

In any of the previous embodiments, the multiolefin, or conjugated diene, or isoprene, when present, content is from greater than 0.5 mol %.

In any of the previous embodiments, the multiolefin, or conjugated diene, or isoprene, when present, content is from greater than 1.0 mol %.

In any of the previous embodiments, the multiolefin, or conjugated diene, or isoprene, when present, content is from greater than 2.5 mol %.

In any of the previous embodiments, the multiolefin, or conjugated diene, or isoprene, when present, content is from greater than 5.0 mol %.

c) In another aspect of the invention, the invention provides for an air barrier comprising a cured elastomeric composition comprising a copolymer comprising an isoolefin, preferably isobutylene, and an alkylstyrene, preferably methylstyrene, even more preferably para-methylstyrene, with new sequence distributions. The copolymer may optionally be halogenated.

In an embodiment, the invention provides for an air barrier comprising a cured elastomeric composition comprising a copolymer comprising an isoolefin and an alkylstyrene, the copolymer having a copolymer sequence distribution defined by:

$$F=1-\{mA/(1+mA)\}$$

wherein m is the copolymer sequence distribution parameter; A is the molar ratio of alkylstyrene to isoolefin in the copolymer; and F is the alkylstyrene-isoolefin-alkylstyrene triad fraction in the copolymer; wherein m is from less than 38.

In another embodiment, the invention provides for an air barrier comprising a cured elastomeric composition comprising a copolymer produced by the process comprising contacting an isoolefin, preferably isobutylene, an alkylstyrene, one or more Lewis acid(s), one or more initiator(s), and a diluent comprising one or more hydrofluorocarbon(s) (HFC's); the copolymer having a copolymer sequence distribution defined by:

$$F=1-\{mA/(1+mA)\}$$

wherein m is the copolymer sequence distribution parameter; A is the molar ratio of alkylstyrene to isoolefin in the copolymer; and F is the alkylstyrene-isoolefin-alkylstyrene triad fraction in the copolymer; wherein m is from less than 38.

In the previous embodiments, the isoolefin may be isobutylene and the alkylstyrene may be methylstyrene, preferably, para-methylstyrene.

In any of the embodiments described in this section, the alkylstyrene content is from greater than 0.5 mol %.

In any of the embodiments in this section, the alkylstyrene content is from greater than 1.5 mol %.

In any of the embodiments in this section, the alkylstyrene content is from greater than 6.0 mol %.

In any of the embodiments in this section, the alkylstyrene content is from greater than 12.5 mol %.

In any of the embodiments described in this section the copolymers may be halogenated to form halogenated copolymers.

In the previous embodiment, the halogenated copolymer is halogenated with chlorine or bromine.

In any of the embodiments described in this section, when present, the halogen content is greater than 0.2 mol %.

In any of the embodiments described in this section, when present, the halogen content is from 0.2 mol % to 5.0 mol %, preferably from 0.2 mol % to 2.0 mol %.

In any of the previous embodiments, the copolymer has a Mw of from greater than 50,000.

In any of the previous embodiments, the copolymer has a Mw of from greater than 100,000.

In any of the previous embodiments, the copolymer has a Mw of from greater than 500,000.

In any of the previous embodiments, the copolymer has a Mw of from greater than 1,000,000.

In any of the previous embodiments, the copolymer has a MWD of from less than 3.

In any of the previous embodiments, the copolymer has a MWD of from 2 to 5.

In any of the previous embodiments, the copolymer has a Mooney viscosity of at least 20±5 (ML 1+8 at 125° C., ASTM D 1646).

In any of the previous embodiments, the copolymer has a Mooney viscosity of from 20±5 to 60±5 (ML 1+8 at 125° C., ASTM D 1646).

In any of the previous embodiments, m is from less than 38.
In any of the previous embodiments, m is from less than 36.
In any of the previous embodiments, m is from less than 35.
In any of the previous embodiments, m is from less than 30.
In other embodiments, m may be from 1-38.
In other embodiments, m may be from 1-36.
In other embodiments, m may be from 1-35.
In other embodiments, m may be from 1-30.

d) In any of the previous embodiments a), b), or c), the cured elastomeric composition may further comprise a blend comprising a secondary rubber selected from the group consisting of at least one of natural rubber, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPR), ethylene-propylene-diene rubber (EPDM), polysulfide, isobutylene/cyclopentadiene copolymer rubber, isobutylene/methyl cyclopentadiene copolymer rubber, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl(polyisobutylene/isoprene copolymer) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-α-methylstyrene) halogenated poly(isobutylene-co-isoprene-co-α-methylstyrene), and mixtures thereof.

DETAILED DESCRIPTION

Various specific embodiments, versions and examples of the invention will now be described, including preferred embodiments and definitions that are adopted herein for purposes of understanding the claimed invention. For determining infringement, the scope of the "invention" will refer to any one or more of the appended claims, including their equivalents, and elements or limitations that are equivalent to those that are recited.

As used herein, the new numbering scheme for the Periodic Table Groups are used as in CHEMICAL AND ENGINEERING NEWS, 63(5), 27 (1985).

Catalyst system refers to and includes any Lewis acid(s) or other metal complex(es) (described herein) used to catalyze the polymerization of the olefinic monomers of the invention, as well as at least one initiator, and optionally other minor catalyst component(s).

Diluent means a diluting or dissolving agent. Diluent is specifically defined to include chemicals that can act as solvents for the Lewis Acid, other metal complexes as herein described, initiators, monomers or other additives. In the practice of the invention, the diluent does not alter the general nature of the components of the polymerization medium, i.e., the components of the catalyst system, monomers, etc. However, it is recognized that interactions between the diluent and reactants may occur. In preferred embodiments, the diluent does not react with the catalyst system components, monomers, etc. to any appreciable extent. Additionally, the term diluent includes mixtures of at least two or more diluents.

A reactor is any container(s) in which a chemical reaction occurs.

Slurry refers to a volume of diluent comprising polymers that have precipitated from the diluent, monomers, Lewis acid, and initiator. The slurry concentration is the volume percent of the partially or completely precipitated polymers based on the total volume of the slurry.

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene.

Elastomer as used herein, refers to any polymer or composition of polymers consistent with the ASTM D1566 definition. The terms may be used interchangeably with the term "rubber(s)."

Elastomeric composition refers to any composition comprising an elastomer as defined above. A cured elastomeric composition refers to any elastomeric composition that has undergone a curing process and/or comprises a curative, through the use of materials and processes conventional in the art regardless of the mechanism employed to cure the elastomeric composition.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

Polymer molecular weights may be determined by SEC (Size Exclusion Chromatography) using a Waters Alliance 2690 separations module equipped with column heaters and a Waters 410 differential refractometer detector. Tetrahydrofuran may be used as eluent (1 ml/min., 35° C.) with a set of Waters Styragel HR 5μ columns of 500, 1000, 2000, $10^4$, $10^5$ and $10^6$ Å pore size. A calibration based on narrow molecular weight polyisobutylene standards (American Polymer Standards) may be used to calculate molecular weights and distributions.

Polymer molecular weights can be determined on other SEC instruments using different calibration and run protocols. The methodology of SEC (also known as GPC or gel permeation chromatography) to characterize polymer molecular weights has been reviewed in many publications. One such source is the review provided by L. H. Tung in *Polymer Yearbook*, H.-G. Elias and R. A. Pethrick, Eds., Harwood Academic Publishers, New York, 1984, pgs. 93-100.

Comonomer incorporation may be determined by $^1$H-NMR spectrometry. NMR measurements may be obtained at a field strength corresponding to 400 MHz or 500 MHz. $^1$H-NMR spectra may be recorded at room temperature on a Bruker Avance NMR spectrometer system using CDCl$_3$ solutions of the polymers. All chemical shifts may be referenced to TMS.

A variety of NMR methods have been used to characterize comonomer incorporation and sequence distribution in copolymers. Many of these methods may be applicable to the polymers of this invention. A general reference which reviews the application of NMR spectrometry to the characterization of polymers is H. R. Kricheldorf in *Polymer Yearbook*, H.-G. Elias and R. A. Pethrick, Eds., Harwood Academic Publishers, New York, 1984, pgs. 249-257.

In some embodiments directed to copolymers of isoolefins and multiolefins, the presence or absence of long chain branching in the polymers may be determined using triple detection SEC (size exclusion chromatography). Triple detection SEC may be performed on a Waters (Milford, Mass.) 150 C chromatograph operated at 40° C. equipped a Precision Detectors (Bellingham, Mass.) PD2040 light scattering detector, a Viscotek (Houston, Tex.) Model 150R viscometry detector and a Waters differential refractive index detector (integral with the 150 C). The detectors may be connected in series with the light scattering detector being first, the viscometry detector second, and the differential refractive index detector third. Tetrahydrofuran may be used as the eluent (0.5 ml/min.) with a set of three Polymer Laboratories, Ltd. (Shropshire, United Kingdom) 10 μm mixed-B/LS GPC columns. The instrument may be calibrated against 16 narrow polystyrene standards (Polymer Laboratories, Ltd.). Data may be acquired with TriSEC software (Viscotek) and imported into WaveMetric's Igor Pro program (Lake Oswego, Oreg.) for analysis. Linear polyisobutylene may be used to establish the relationship between the intrinsic viscosity [η]$_{linear}$ determined by the viscometry detector) and the molecular weight (M$_w$, determined by the light scattering detector). The relationship between [η]$_{linear}$ and M$_w$ may be expressed by the Mark-Houwink equation.

$$[\eta]_{linear} = KM_w^\alpha$$

Parameters K and α may be obtained from the double-logarithmic plot of intrinsic viscosity against M$_w$, α is the slope, K the intercept. Significant deviations from the relationship established for the linear standards indicate the presence of long chain branching. Generally, polymers which exhibit more significant deviation from the linear relationship contain more significant long chain branching. The scaling factor g' also indicates deviations from the determined linear relationship.

$$[\eta]_{sample} = g'[\eta]_{linear}$$

The value of g' is defined to be less than or equal to one and greater than or equal to zero. When g' is equal or nearly equal to one, the polymer is considered to be linear. When g' is significantly less than one, the sample is long chain branched. See e.g. E. F. Casassa and G. C. Berry in *Comprehensive Polymer Science*, Vol. 2, (71-120) G. Allen and J. C. Bevington, Ed., Pergamon Press, New York, 1988. In triple detection SEC, a g' is calculated for each data slice of the chromatographic curve. A viscosity average g' or g'$_{vis.avg.}$ is calculated across the entire molecular weight distribution. The scaling factor g'$_{vis.avg.}$ is calculated from the average intrinsic viscosity of the sample.

$$g'_{vis.avg.} = [\eta]_{avg.}/(KM_w^\alpha)$$

In certain embodiments, a polymer that is substantially free of long chain branching is defined to be a polymer for which g'$_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection SEC as described herein. For more information, see International Application No. PCT/US03/40341.

In some other embodiments directed to copolymers of isoolefins and multiolefins, triad sequence distributions may be obtained from $^{13}$C NMR spectrometry using a Varian Unity spectrometer at a field strength of 125.7 MHz and a temperature of 50° C. Polymer samples may be dissolved into CDCl$_3$ (containing 1.5% wt./v. of chromium (III) acetylacetonate as a relaxation agent) at a concentration of 6 to 8 wt. %. The free induction decays may be collected with a 90° pulse, 3.0 second recycle delay and a 2.133 second acquisition time. Each data set may consist of a sweep width of 30,007 Hz and 30,000 scans/transients. All chemical shifts may be referenced to tetramethylsilane.

Data processing may be performed with the NutsPro NMR Utility Transform Software from Acorn NMR, Inc. (Livermore, Calif.). The carbon-13 free induction decays may be Fourier transformed with 65K points and 1 Hz line broadening, and the resulting spectra may be phased and baseline corrected. The areas of the olefinic resonances may be measured by peak deconvolution, rather than manual integration, in order to optimize measurement accuracy. A peak profile of 85% Lorentzian and 15% Gaussian character may be assumed for the calculation. Linewidth, height, and position may be varied to obtain the fit.

The isoprene triad resonances may be assigned according to information reported by C. Corno, A. Proni, A. Priola, and S. Cesca in *Macromolecules* 1980, 13, 1092 and J. L. White, T. D. Shaffer, C. J. Ruff, and J. P. Cross in Macromolecules 1995, 28, 3290. For each triad structure, a quaternary carbon and a tertiary carbon resonance may be observed. The BII (B=isobutylene, I=isoprene) olefin triad fractions may be calculated for each type of carbon, quaternary and tertiary. For example, the BII value for tertiary carbons may be calculated by dividing the average of the BII tertiary carbon integral and the IIB tertiary carbon integral by the sum of all the tertiary integrals for BIB, BII, IIB, and III triads. By definition, the BII triad fraction must equal the IIB triad fraction. Once BII triad fractions may be calculated for each carbon type, tertiary and quaternary, these values may be averaged and used for comparison with the amount of isoprene incorporated into the copolymer. A plot of the BII fraction (expressed as a percentage of all isoprene centered triads e.g. 100×BII fraction) versus mol % isoprene incorporated into the copolymer may be created.

In certain embodiments, the relationship between the BII triad fraction and the mol % isoprene incorporated into the copolymer may be described by the copolymer sequence distribution equation described below and may be characterized by the copolymer sequence distribution parameter, m.

$$F_{BII} = mA/(1+mA)^2$$

where: m is the copolymer sequence distribution parameter,

A is the molar ratio of isoprene to isobutylene in the copolymer, [IP]/[IB] and, F$_{BII}$ is the BII triad fraction in the copolymer.

The best fit of this equation yields the value of m for copolymerization of isobutylene and isoprene in each diluent.

Data obtained by $^{13}$C NMR spectrometry may be fit by iterative solution to the copolymer sequence distribution equation to obtain a best fit. The best fit of this equation yields the sequence distribution parameter, m, for copolymerization of isobutylene and isoprene in each diluent. For more information, see International Application No. PCT/US03/40916.

In yet other embodiments directed to copolymers of isoolefins and alkystyrenes, the BSB (B=isobutylene, S=p-methylstyrene) triad fraction may be obtained from $^1$H NMR spectrometry at a field strength of 400 or 500 MHz. Polymer samples may be dissolved into CDCl$_3$ at 1-2 w/v %. The free induction decays may be collected on the deuterated chloroform solutions with a 45° pulse, 1 second recycle delay and a 3.96 second acquisition time. All chemical shifts may be referenced to tetramethylsilane.

The BSB triad resonance may be assigned according to information reported in J. R. Ashbaugh, C. J. Ruff, T. D. Shaffer *J. Polym. Sci., A. Polym. Chem.* 2000, 38, 1680. The percentage of BSB triads in the copolymer may be calculated from the $^1$H-NMR spectrum according to the following equation.

$$\% BSB = 100(4A/(A+B))$$

where: A=integral value of the 2.8 ppm resonance

B=integral value of resonances between 2.6 and 2.2 ppm

In certain embodiments, the relationship between the BSB triad fraction and the mol % p-alkylstyrene incorporated into the copolymer may be described by the copolymer sequence distribution equation described below and may be characterized by the copolymer sequence distribution parameter, m.

$$F_{BSB} = 1 - \{mA/(1+mA)\}$$

where: m is the copolymer sequence distribution parameter,

A is the molar ratio of isoprene to isobutylene in the copolymer, [pMS]/[IB] and, $F_{BSB}$ is the BSB triad fraction in the copolymer.

The BSB and mol % p-methylstyrene (p-MS) data obtained by $^1$H-NMR spectrometry may be fit by iterative solution of the copolymer sequence distribution equation to obtain a best fit. The best fit of this equation yields the sequence distribution parameter, m, for copolymerization of isobutylene and p-methylstyrene in each diluent. For more information, see International Application No. PCT/US03/40852.

Monomers and Polymers

Monomers which may be polymerized by this system include any hydrocarbon monomer that is polymerizable using this invention. Preferred monomers include one or more of olefins, alpha-olefins, disubstituted olefins, isoolefins, conjugated dienes, non-conjugated dienes, styrenics and/or substituted styrenics and vinyl ethers. The styrenic may be substituted (on the ring) with an alkyl, aryl, halide or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, 13-pinene, myrcene, 6,6-dimethyl-fulvene, hexadiene, cyclopentadiene, piperylene, methyl vinyl ether, ethyl vinyl ether, and isobutyl vinyl ether and the like. Monomer may also be combinations of two or more monomers. Styrenic block copolymers may also be used a monomers. Preferred block copolymers include copolymers of styrenics, such as styrene, para-methylstyrene, alpha-methylstyrene, and C$_4$ to C$_{30}$ diolefins, such as isoprene, butadiene, and the like. Particularly preferred monomer combinations include 1) isobutylene and para-methyl styrene 2) isobutylene and isoprene, as well as homopolymers of isobutylene.

Additionally, preferred monomers include those that are cationically polymerizable as described in *Cationic Polymerization of Olefins, A Critical Inventory*, Joseph Kennedy, Wiley Interscience, New York 1975. Monomers include any monomer that is cationically polymerizable, such as those monomers that are capable of stabilizing a cation or propagating center because the monomer contains an electron donating group. For a detailed discussion of cationic catalysis please see *Cationic Polymerization of Olefins*, A Critical Inventory, Joseph Kennedy, Wiley Interscience, New York 1975.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, alternatively and from 15 wt % to 1 wt % in another embodiment.

Preferred polymers include homopolymers of any of the monomers listed in this Section. Examples of homopolymers include polyisobutylene, polypara-methylstyrene, polyisoprene, polystyrene, polyalpha-methylstyrene, polyvinyl ethers (such as polymethylvinylether, polyethylvinylether).

Preferred polymers also include copolymers of 1) isobutylene and an alkylstyrene; and 2) isobutylene and isoprene.

In one embodiment butyl polymers are prepared by reacting a comonomer mixture, the mixture having at least (1) a C$_4$ to C$_6$ isoolefin monomer component such as isobutene with (2) a multiolefin, or conjugated diene monomer component. The isoolefin is in a range from 70 to 99.5 wt % by weight of the total comonomer mixture in one embodiment, 85 to 99.5 wt % in another embodiment. In yet another embodiment the isoolefin is in the range of 92 to 99.5 wt %. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene. The C$_4$ to C$_6$ isoolefin may be one or more of isobutene, 2-methyl-1-butene, 3-methyl-1-butene, 2-methyl-2-butene, and 4-methyl-1-pentene. The multiolefin may be a C$_4$ to C$_{14}$ conjugated diene such as isoprene, butadiene, 2,3-dimethyl-1,3-butadiene, 13-pinene, myrcene, 6,6-dimethyl-fulvene, hexadiene, cyclopentadiene and piperylene. One embodiment of the butyl rubber polymer of the invention is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment. The following table illustrates how the above-referenced wt % would be expressed as mol %.

TABLE 1

| wt % IC4[a] | mol % IC4 | wt % IC5[b] | Mol % IC5 |
|---|---|---|---|
| 70 | 73.9 | .5 | .4 |
| 85 | 87.3 | 5 | 4.2 |
| 92 | 93.3 | 8 | 6.7 |
| 95 | 95.9 | 15 | 12.7 |
| 99.5 | 99.6 | 30 | 26.1 |

[a]IC4—isobutylene
[b]IC5—isoprene

In one embodiment, the relationship between the triad fraction of an isoolefin and a multiolefin and the mol % or multiolefin incorporated into the copolymer is described by the copolymer sequence distribution equation described below and is characterized by the copolymer sequence distribution parameter, m.

$$F = mA/(1+mA)^2$$

where: m is the copolymer sequence distribution parameter,

A is the molar ratio of multiolefin to isoolefin in the copolymer and,

F is the isoolefin-multiolefin-multiolefin triad fraction in the copolymer.

The best fit of this equation yields the value of m for copolymerization of the isoolefin and multiolefin in each diluent.

In certain embodiments, m is from greater than 1.5; alternatively, from greater than 2.0; alternatively, from greater than 2.5; alternatively, from greater than 3.0; and alternatively, from greater than 3.5.

In other embodiments, m is from 1.10 to 1.25; alternatively, from 1.15 to 1.20; alternatively, from 1.15 to 1.25; and alternatively, m is about 1.20.

In another embodiment, the relationship between the triad fraction of an isoolefin and a p-alkylstyrene and the mol % of p-alkylstyrene incorporated into the copolymer is described by the copolymer sequence distribution equation described below and is characterized by the copolymer sequence distribution parameter, m.

$$F = 1 - \{mA/(1+mA)\}$$

where: m is the copolymer sequence distribution parameter,

A is the molar ratio of p-alkylstyrene to isoolefin in the copolymer and,

F is the p-alkylstyrene-isoolefin-p-alkylstyrene triad fraction in the copolymer.

The best fit of this equation yields the value of m for copolymerization of the isoolefin and p-alkylstyrene in each diluent.

In certain embodiments, m is from less than 38; alternatively, from less than 36; alternatively, from less than 35; and alternatively, from less than 30.

In other embodiments, m is from 1-38; alternatively, from 1-36; alternatively, from 1-35; and alternatively from 1-30.

This invention further relates to terpolymers and tetrapolymers comprising any combination of the monomers listed above. Preferred terpolymers and tetrapolymers include polymers comprising isobutylene, isoprene and divinylbenzene, polymers comprising isobutylene, para-alkylstyrene (preferably para-methyl styrene) and isoprene, polymers comprising cyclopentadiene, isobutylene, and paraalkyl styrene (preferably para-methyl styrene), polymers of isobutylene cyclopentadiene and isoprene, polymers comprising cyclopentadiene, isobutylene, and methyl cyclopentadiene, polymers comprising isobutylene, para-methylstyrene and cyclopentadiene.

Lewis Acid

The Lewis acid (also referred to as the co-initiator or catalyst) may be any Lewis acid based on metals from Group 4, 5, 13, 14 and 15 of the Periodic Table of the Elements, including boron, aluminum, gallium, indium, titanium, zirconium, tin, vanadium, arsenic, antimony, and bismuth. One skilled in the art will recognize that some elements are better suited in the practice of the invention. In one embodiment, the metals are aluminum, boron and titanium, with aluminum being desirable. Illustrative examples include $AlCl_3$, (alkyl)$AlCl_2$, $(C_2H_5)_2AlCl$ and $(C_2H_5)_3Al_2Cl_3$, $BF_3$, $SnCl_4$, $TiCl_4$.

Additionally, Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred.

Lewis acids such as methylaluminoxane (MAO) and specifically designed weakly coordinating Lewis acids such as $B(C_6F_5)_3$ are also suitable Lewis acids within the context of the invention.

As one skilled in the art will recognize the aforementioned listing of Lewis acids is not exhaustive and is provided for illustration. For a more information regarding Lewis acids in polymerization processes, see, for example, International Application Nos. PCT/US03/40903 and PCT/US03/40340.

Initiator

Initiators useful in this invention are those initiators which are capable of being complexed in a suitable diluent with the chosen Lewis acid to yield a complex which rapidly reacts with the olefin thereby forming a propagating polymer chain. Illustrative examples include Brønsted acids such as $H_2O$, HCl, RCOOH (wherein R is an alkyl group), and alkyl halides, such as $(CH_3)_3CCl$, $C_6H_5C(CH_3)_2Cl$ and (2-Chloro-2,4,4-trimethylpentane). More recently, transition metal complexes, such as metallocenes and other such materials that can act as single site catalyst systems, such as when activated with weakly coordinating Lewis acids or Lewis acid salts have been used to initiate isobutylene polymerization.

In an embodiment, the initiator comprises one or more of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, or arylalkylacid halide.

As one skilled in the art will recognize the aforementioned listing of initiator(s) is not exhaustive and is provided for illustration. For a more information regarding initiator(s) in polymerization processes, see, for example, International Application Nos. PCT/US03/40903 and PCT/US03/40340.

Hydrofluorocarbons

Hydrofluorocarbons are preferably used as diluents in the present invention, alone or in combination with other hydrofluorocarbons or in combination with other diluents. For purposes of this invention and the claims thereto, hydrofluorocarbons ("HFC's" or "HFC") are defined to be saturated or unsaturated compounds consisting essentially of hydrogen, carbon and fluorine, provided that at least one carbon, at least one hydrogen and at least one fluorine are present.

In certain embodiments, the diluent comprises hydrofluorocarbons represented by the formula: $C_xH_yF_z$ wherein x is an integer from 1 to 40, from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

Illustrative examples include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof and including mixtures of unsaturated HFC's described below. Particularly preferred HFC's include difluoromethane, trifluoromethane, 1,1-difluoroethane, 1,1,1-trifluoroethane, fluoromethane, and 1,1,1,2-tetrafluoroethane.

Illustrative examples of unsaturated hydrofluorocarbons include vinyl fluoride; 1,1-difluoroethene; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluoro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof and including mixtures of saturated HFC's described above.

In one embodiment, the diluent comprises non-perfluorinated compounds or the diluent is a non-perfluorinated diluent. Perfluorinated compounds being those compounds consisting of carbon and fluorine. However, in another embodiment, when the diluent comprises a blend, the blend may comprise perfluorinated compound, preferably, the catalyst, monomer, and diluent are present in a single phase or the aforementioned components are miscible with the diluent as described in further detail below. In another embodiment, the blend may also comprise chlorofluorocarbons (CFC's), or those compounds consisting of chlorine, fluorine, and carbon.

In another embodiment, when higher weight average molecular weights (Mw) (typically greater than 10,000 Mw, preferably more than 50,000 Mw, more preferably more than 100,000 Mw) are desired, suitable diluents include hydrofluorocarbons with a dielectric constant of greater than 10 at −85° C., preferably greater than 15, more preferably greater than 20, more preferably greater than 25, more preferably 40 or more. In embodiments where lower molecular weights (typically lower than 10,000 Mw, preferably less than 5,000 Mw, more preferably less than 3,000 Mw) are desired the dielectric constant may be less than 10, or by adding larger amounts of initiator or transfer agent when the dielectric constant is above 10. The dielectric constant of the diluent $\epsilon_D$ is determined from measurements of the capacitance of a parallel-plate capacitor immersed in the diluent [measured value $C_D$], in a reference fluid of known dielectric constant $\epsilon_R$ [measured value $C_R$], and in air ($\epsilon_A = 1$) [measured value $C_A$]. In each case the measured capacitance $C_M$ is given by $C_M = \epsilon C_C + C_S$, where $\epsilon$ is the dielectric constant of the fluid in which the capacitor is immersed, $C_C$ is the cell capacitance, and $C_S$ is the stray capacitance. From these measurements $\epsilon_D$ is given by the formula $\epsilon_D = ((C_D - C_A) \epsilon_R + (C_R - C_D))/(C_R - C_A)$. Alternatively, a purpose-built instrument such as the Brookhaven Instrument Corporation BIC-870 may be used to measure dielectric constant of diluents directly. A comparison of the dielectric constants ($\epsilon$) of a few selected diluents at −85° C. is provided in Table 2.

TABLE 2

| Diluent | $\epsilon$ at −85° C. |
|---|---|
| Methyl chloride | 18.34 |
| Difluoromethane | 36.29 |
| 1,1-difluoroethane | 29.33 |
| 1,1,1-trifluoroethane | 22.18 |
| 1,1,1,2-tetrafluoroethane | 23.25 |
| 1,1,2,2-tetrafluoroethane | 11.27 |
| 1,1,1,2,2-pentafluoroethane | 11.83 |

In other embodiments, one or more HFC's are used in combination with another diluent or mixtures of diluents. Suitable additional diluents include hydrocarbons, especially hexanes and heptanes, halogenated hydrocarbons, especially chlorinated hydrocarbons and the like. Specific examples include but are not limited to propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and the halogenated versions of all of the above, preferably the chlorinated versions of the above, more preferably fluorinated versions of all of the above. Brominated versions of the above are also useful. Specific examples include, methyl chloride, methylene chloride, ethyl chloride, propyl chloride, butyl chloride, chloroform and the like.

In another embodiment, non-reactive olefins may be used as diluents in combination with HFC's. Examples include, but are not limited to, ethylene, propylene, and the like.

In one embodiment, the HFC is used in combination with a chlorinated hydrocarbon such as methyl chloride. Additional embodiments include using the HFC in combination with hexanes or methyl chloride and hexanes. In another embodiment the HFC's are used in combination with one or more gases inert to the polymerization such as carbon dioxide, nitrogen, hydrogen, argon, neon, helium, krypton, zenon, and/or other inert gases that are preferably liquid at entry to the reactor. Preferred gases include carbon dioxide and/or nitrogen.

In another embodiment the HFC's are used in combination with one or more nitrated alkanes, including $C_1$ to $C_{40}$ nitrated linear, cyclic or branched alkanes. Preferred nitrated alkanes include, but are not limited to, nitromethane, nitroethane, nitropropane, nitrobutane, nitropentane, nitrohexane, nitroheptane, nitrooctane, nitrodecane, nitrononane, nitrododecane, nitroundecane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above. A preferred embodiment is HFC's blended with nitromethane.

The HFC is typically present at 1 to 100 volume % based upon the total volume of the diluents, alternatively between 5 and 100 volume %, alternatively between 10 and 100 volume %, alternatively between 15 and 100 volume %, alternatively between 20 and 100 volume %, alternatively between 25 and 100 volume %, alternatively between 30 and 100 volume %, alternatively between 35 and 100 volume %, alternatively between 40 and 100 volume %, alternatively between 45 and 100 volume %, alternatively between 50 and 100 volume %, alternatively between 55 and 100 volume %, alternatively between 60 and 100 volume %, alternatively between 65 and 100 volume %, alternatively between 70 and 100 volume %, alternatively between 75 and 100 volume %, alternatively between 80 and 100 volume %, alternatively between 85 and 100 volume %, alternatively between 90 and 100 volume %, alternatively between 95 and 100 volume %, alternatively between 97 and 100 volume %, alternatively between 98 and 100 volume %, and alternatively between 99 and 100 volume %. In a preferred embodiment the HFC is blended with one or more chlorinated hydrocarbons. In another preferred embodiment the HFC is selected from the group consisting of difluoromethane, trifluoromethane, 1,1-difluoroethane, 1,1,1-trifluoroethane, and 1,1,1,2-tetrafluoroethane and mixtures thereof.

In another embodiment the diluent or diluent mixture is selected based upon its solubility in the polymer. Certain diluents are soluble in the polymer. Preferred diluents have little to no solubility in the polymer. Solubility in the polymer is measured by forming the polymer into a film of thickness between 50 and 100 microns, then soaking it in diluent (enough to cover the film) for 4 hours at −75° C. The film is removed from the diluent, exposed to room temperature for 90 seconds to evaporate excess diluent from the surface of the film, and weighed. The mass uptake is defined as the percentage increase in the film weight after soaking. The diluent or diluent mixture is chosen so that the polymer has a mass uptake of less than 4 wt %, preferably less than 3 wt %, preferably less than 2 wt %, preferably less than 1 wt %, more preferably less than 0.5 wt %.

In a preferred embodiment, the diluent or diluent mixture is selected such that the difference between the measured glass transition temperature Tg of the polymer with less than 0.1 wt % of any diluent, unreacted monomers and additives is within 15° C. of the Tg of the polymer measured after it has been formed into a film of thickness between 50 and 100 microns, that has been soaked in diluent (enough to cover the film) for 4 hours at −75° C. The glass transition temperature is determined by differential scanning calorimetry (DSC).

Techniques are well described in the literature, for example, B. Wunderlich, "The Nature of the Glass Transition and its Determination by Thermal Analysis", in *Assignment of the Glass Transition*, ASTM STP 1249, R. J. Seyler, Ed., American Society for Testing and Materials, Philadelphia, 1994, pp. 17-31. The sample is prepared as described above, sealed immediately after soaking into a DSC sample pan, and maintained at a temperature below −80° C. until immediately before the DSC measurement. Preferably the Tg values are within 12° C. of each other, preferably within 11° C. of each other, preferably within 10° C. of each other, preferably within 9° C. of each other, preferably within 8° C. of each other, preferably within 7° C. of each other, preferably within 6° C. of each other, preferably within 5° C. of each other, preferably within 4° C. of each other, preferably within 3° C. of each other, preferably within 3° C. of each other, preferably within 2° C. of each other, preferably within 1° C. of each other.

Polymerization Process

The invention may be practiced in continuous and batch processes. Further the invention may be practiced in a plug flow reactor and/or stirred tank reactors. In particular this invention may be practiced in "butyl reactors." Illustrative examples include any reactor selected from the group consisting of a continuous flow stirred tank reactor, a plug flow reactor, a moving belt or drum reactor, a jet or nozzle reactor, a tubular reactor, and an autorefrigerated boiling-pool reactor.

In another aspect, heat can be removed by use of heat transfer surfaces, such as in a tubular reactor where a coolant is on one side of the tube and the polymerizing mixture is on the other side. Heat may also be removed by evaporating the polymerizing mixture, such as may be found in an autorefrigerated boiling pool type reactor. Another example, is a plug flow reactor where a portion of the polymerizing mixture is evaporated as the mixture proceeds through the reactor. Another example is where heat is removed in a plug flow reactor through surface heat transfer using coolant on the other side of a heat transfer surface. Another example would be a reactor where polymerization takes place on a moving belt or drum where the diluent/monomer/catalyst mixture is sprayed onto the belt or drum and heat is removed by evaporation of the diluent as the reaction proceeds. In addition heat may be removed in such reactors by surface heat transfer (such as where the coolant is present on the inside of the drum or under the belt and the polymer is produced on the other side of the belt or drum). Another type of reactor is a jet or nozzle reactor. These reactors have a short residence time where the monomer, diluent and catalyst system are combined in the jet or nozzle and the polymerization occurs as the mixture passes through the nozzle at high velocity.

Preferred reactors include continuous flow stirred tank reactors, whether operating in batch or continuous mode, and whether operating in a tank with an agitator or in a tube type reactor. Preferred reactors also include reactors where the polymerization occurs on one side of a heat transfer surface and the coolant is present on the other side. An example is a reactor where tubes containing coolant run inside the reactor polymerization zone. Another example would be where the polymerization occurs inside a tube and the coolant is present on the outside of the tube in a shell.

This invention may also be practiced in batch reactors where the monomers, diluent, and catalyst are charged to the reactor and then polymerization proceeds to completion (such as by quenching) and the polymer is then recovered.

In certain embodiments, the invention is practiced using a slurry polymerization process. However, other polymerization methods are contemplated such as a solution polymerization process. The polymerization processes of the invention may be cationic polymerization processes.

In one embodiment, the polymerization is carried out where the catalyst, monomer, and diluent are present in a single phase. Preferably, the polymerization is carried-out in a continuous polymerization process in which the catalyst, monomer(s), and diluent are present as a single phase. In slurry polymerization, the monomers, catalyst(s), and initiator(s) are all miscible in the diluent or diluent mixture, i.e., constitute a single phase, while the polymer precipitates from the diluent with good separation from the diluent. Desirably, reduced or no polymer "swelling" is exhibited as indicated by little or no Tg suppression of the polymer and/or little or no diluent mass uptake. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

The reacted monomers within the reactor form part of a slurry. In one embodiment, the concentration of the solids in the slurry is equal to or greater than 10 vol %. In another embodiment, the concentration of solids in the slurry is present in the reactor equal to or greater than 25 vol %. In yet another embodiment, the concentration of solids in the slurry is less than or equal to 75 vol %. In yet another embodiment, the concentration of solids in slurry is present in the reactor from 1 to 70 vol %. In yet another embodiment, the concentration of solids in slurry is present in the reactor from 5 to 70 vol %. In yet another embodiment, the concentration of solids in slurry concentration is present in the reactor from 10 to 70 vol %. In yet another embodiment, the concentration of solids in slurry concentration is present in the reactor from 15 to 70 vol %. In yet another embodiment, the concentration of solids in slurry concentration is present in the reactor from 20 to 70 vol %. In yet another embodiment, the concentration of solids in slurry concentration is present in the reactor from 25 to 70 vol %. In yet another embodiment, the concentration of solids in slurry concentration is present in the reactor from 30 to 70 vol %. In yet another embodiment, the concentration of solids in slurry concentration is present in the reactor from 40 to 70 vol %.

Typically, a continuous flow stirred tank-type reactor may be used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation.

The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

Other reactors that may be utilized in the practice of the present invention include any conventional reactors and equivalents thereof capable of performing a continuous slurry process, such as disclosed in U.S. Pat. No. 5,417,930, herein incorporated by reference. The reactor pump impeller can be of the up-pumping variety or the down-pumping variety. The reactor will contain sufficient amounts of the catalyst system of the present invention effective to catalyze the polymerization of the monomer containing feed-stream such that a sufficient amount of polymer having desired characteristics is produced. The feed-stream in one embodiment contains a total monomer concentration greater than 5 wt % (based on the total weight of the monomers, diluent, and catalyst system), preferably greater than 15 wt %, greater than 30 wt % in another embodiment. In yet another embodiment, the feed-stream will contain from 5 wt % to 50 wt % monomer concentration based on the total weight of monomer, diluent, and catalyst system.

In some embodiments, the feed-stream is substantially free from silica cation producing species. By substantially free of silica cation producing species, it is meant that there is no more than 0.0005 wt % based on the total weight of the monomers of these silica cation producing species in the feed stream. Typical examples of silica cation producing species are halo-alkyl silica compounds having the formula $R_1R_2R_3SiX$ or $R_1R_2SiX_2$, etc., wherein "R" is an alkyl and "X" is a halogen. The reaction conditions will be such that desirable temperature, pressure and residence time are effective to maintain the reaction medium in the liquid state and to produce the desired polymers having the desired characteristics. The monomer feed-stream is typically substantially free of any impurity which is adversely reactive with the catalyst under the polymerization conditions. For example, In some embodiments, the monomer feed preferably should be substantially free of bases (such as caustic), sulfur-containing compounds (such as $H_2S$, COS, and organo-mercaptans, e.g., methyl mercaptan, ethyl mercaptan), nitrogen-containing bases, oxygen containing bases such as alcohols and the like. However monomer feed may be less pure, typically not less than 95% based on total olefinic content, more preferably not less than 98%, not less than 99%. In preferred embodiments the impurities are present at less than 10,000 ppm (by weight), preferably less that 500 ppm, preferably less than 250 ppm, preferably less than 150 ppm, preferably less than 100 ppm.

As is normally the case, reaction time, temperature, concentration, the nature of the reactants, and similar factors determine product molecular weights. The polymerization reaction temperature is conveniently selected based on the target polymer molecular weight and the monomer to be polymerized as well as standard process variable and economic considerations, e.g., rate, temperature control, etc. The temperature for the polymerization is less than 0° C., preferably between –10° C. and the freezing point of the slurry in one embodiment, and from –25° C. to –120° C. in another embodiment. In yet another embodiment, the polymerization temperature is from –40° C. to –100° C., and from –70° C. to –100° C. in yet another embodiment. In yet another desirable embodiment, the temperature range is from –80° C. to –100° C. Consequently, different reaction conditions will produce products of different molecular weights. Synthesis of the desired reaction product may be achieved, therefore, through monitoring the course of the reaction by the examination of samples taken periodically during the reaction; a technique widely employed in the art.

In a preferred embodiment, the polymerization temperature is within 10° C. above the freezing point of the diluent, preferably within 8° C. above the freezing point of the diluent, preferably within 6° C. above the freezing point of the diluent, preferably within 4° C. above the freezing point of the diluent, preferably within 2° C. above the freezing point of the diluent, preferably within 1° C. above the freezing point of the diluent. For the purposes of this invention and the claims thereto when the phrase "within X° C. above the freezing point of the diluent" is used it means the freezing point of the diluent plus X° C. For example if the freezing point of the diluent is –98° C., then 10° C. above the freezing point of the diluent is –88° C.

The reaction pressure will be from above 0 to 14,000 kPa in one embodiment (where 0 kPa is a total vacuum), from 7 kPa to 12,000 kPa in another embodiment, from 100 kPa to 2000 kPa in another embodiment, from 200 kPa to 1500 kPa in another embodiment, from 200 kPa to 1200 kPa in another embodiment, and from 200 kPa to 1000 kPa in yet another embodiment, from 7 kPa to 100 kPa in another embodiment, from 20 kPa to 70 kPa in another embodiment, from 40 kPa to 60 kPa in yet another embodiment, from 1000 kPa to 14,000 kPa in another embodiment, from 3000 kPa to 10,000 kPa in another embodiment, and from 3,000 kPa to 6,000 kPa in yet another embodiment.

The order of contacting the monomer feed-stream, catalyst, initiator, and diluent may vary from one embodiment to another.

In another embodiment, the initiator and Lewis acid are pre-contacted by mixing together in the selected diluent for a prescribed amount of time ranging from 0.01 second to 10 hours, and then is injected into the continuous reactor through a catalyst nozzle or injection apparatus. In yet another embodiment, Lewis acid and the initiator are added to the reactor separately. In another embodiment, the initiator is blended with the feed monomers before injection to the reactor. Desirably, the monomer is not contacted with the Lewis acid, or the Lewis acid combined with the initiator before the monomers enter the reactor.

In an embodiment of the invention, the initiator and Lewis acid are allowed to pre-contact by mixing together in the selected diluent at temperatures between –40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

In another embodiment of the invention, the initiator and Lewis acid are allowed to pre-contact by mixing together in the selected diluent at temperatures between 80 and –150° C., typically between –40° C. and –98° C.

The overall residence time in the reactor can vary, depending upon, e.g., catalyst activity and concentration, monomer concentration, feed injection rate, production rate, reaction temperature, and desired molecular weight, and generally will be between about a few seconds and five hours, and typically between about 10 and 60 minutes. Variables influencing residence time include the monomer and diluent feed injection rates and the overall reactor volume.

The catalyst (Lewis acid) to monomer ratio utilized will be those conventional in this art for carbocationic polymerization processes. In one embodiment of the invention, the monomer to catalyst mole ratios will typically be from 500 to 10000, and in the range of 2000 to 6500 in another embodiment. In yet another desirable embodiment, the ratio of Lewis acid to initiator is from 0.5 to 10, or from 0.75 to 8. The overall concentration of the initiator in the reactor is typically from 5 to 300 ppm or 10 to 250 ppm. The concentration of the initiator in the catalyst feed stream is typically from 50 to 3000 ppm in one embodiment. Another way to describe the amount of initiator in the reactor is by its amount relative to the polymer. In one embodiment, there is from 0.25 to 20 moles polymer/mole initiator, and from 0.5 to 12 mole polymer/mole initiator in another embodiment.

The reactor will contain sufficient amounts of the catalyst system of the present invention to catalyze the polymerization of the monomer containing feed-stream such that a sufficient amount of polymer having desired characteristics is produced. The feed-stream in one embodiment contains a total monomer concentration greater than 20 wt % (based on the total weight of the monomers, diluent, and catalyst system), greater than 25 wt % in another embodiment. In yet another embodiment, the feed-stream will contain from 30 wt % to 50 wt % monomer concentration based on the total weight of monomer, diluent, and catalyst system.

Catalyst efficiency (based on Lewis acid) in the reactor is maintained between 10,000 pounds of polymer per pound of catalyst and 300 pounds of polymer per pound of catalyst and desirably in the range of 4000 pounds of polymer per pound of catalyst to 1000 pounds of polymer per pound of catalyst by controlling the molar ratio of Lewis acid to initiator.

In one embodiment, the polymerization of cationically polymerizable monomers (such as polymerization of isobutylene and isoprene to form butyl rubber) comprises several steps. First, a reactor having a pump impeller capable of up-pumping or down-pumping is provided. The pump impeller is typically driven by an electric motor with a measurable amperage. The reactor typically is equipped with parallel vertical reaction tubes within a jacket containing liquid ethylene. The total internal volume, including the tubes, is greater than 30 to 50 liters, thus capable of large scale volume polymerization reactions. The reactor typically uses liquid ethylene to draw the heat of the polymerization reaction away from the forming slurry. The pump impeller keeps a constant flow of slurry, diluent, catalyst system and unreacted monomers through the reaction tubes. A feed-stream of the cationically polymerizable monomer(s) (such as isoprene and isobutylene) in a polar diluent is charged into the reactor, the feed-stream containing less than 0.0005 wt % of cation producing silica compounds, and typically free of aromatic monomers. The catalyst system is then charged into the reactor, the catalyst system having a Lewis acid and an initiator present in a molar ratio of from 0.50 to 10.0. Within the reactor, the feed-stream of monomers and catalyst system are allowed to contact one another, the reaction thus forming a slurry of polymer (such as butyl rubber), wherein the solids in the slurry has a concentration of from 20 vol % to 50 vol %. Finally, the thus formed polymer (such as butyl rubber) is allowed to exit the reactor through an outlet or outflow line while simultaneously allowing the feed-stream charging to continue, thus constituting the continuous slurry polymerization. Advantageously, the present invention improves this process in a number of ways, e.g., by ultimately reducing the amount of polymer accumulation on the reactor walls, heat transfer surfaces, agitators and/or impeller(s), and in the outflow line or exit port, as measured by pressure inconsistencies or "jumps."

In one embodiment, the resultant polymer from one embodiment of the invention is a polyisobutylene/isoprene polymer (butyl rubber) that has a molecular weight distribution of from about 2 to 5, and an unsaturation of from 0.5 to 2.5 mole per 100 mole of monomer. This product may be subjected to subsequent halogenation to afford a halogenated butyl rubber.

Elastomeric Compositions and End Use Articles

The polymers produced according to the processes described above may be combined with other components conventional in the art to produce elastomeric compositions that may ultimately be fabricated into end use articles. For example, the elastomeric compositions may contain at least one plastomer.

The plastomers that are useful in the present invention can be described as polyolefin copolymers having a density of from 0.85 to 0.915 g/cm$^3$ and a melt index (MI) between 0.10 and 30 dg/min. In one embodiment, the useful plastomer is a copolymer of ethylene derived units and at least one of $C_3$ to $C_{10}$ α-olefin derived units, the copolymer having a density in the range of less than 0.915 g/cm$^3$. The amount of comonomer ($C_3$ to $C_{10}$ α-olefin derived units) present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

The plastomer useful in the invention has a melt index (MI) of between 0.10 and 20 dg/min (ASTM D 1238; 190° C., 2.1 kg) in one embodiment, and from 0.2 to 10 dg/min in another embodiment, and from 0.3 to 8 dg/min in yet another embodiment. The average molecular weight of useful plastomers ranges from 10,000 to 800,000 in one embodiment, and from 20,000 to 700,000 in another embodiment. The 1% secant flexural modulus (ASTM D 790) of useful plastomers ranges from 10 MPa to 150 MPa in one embodiment, and from 20 MPa to 100 MPa in another embodiment. Further, the plastomer that is useful in compositions of the present invention has a melting temperature (Tm) of from 50 to 62° C. (first melt peak) and from 65 to 85° C. (second melt peak) in one embodiment, and from 52 to 60° C. (first melt peak) and from 70 to 80° C. (second melt peak) in another embodiment.

Plastomers useful in the present invention are metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm$^3$ in one embodiment. The molecular weight distribution (Mw/Mn) of desirable plastomers ranges from 2 to 5 in one embodiment, and from 2.2 to 4 in another embodiment. Examples of a commercially available plastomers are EXACT 4150, a copolymer of ethylene and 1-hexene, the 1-hexene derived units making up from 18 to 22 wt % of the plastomer and having a density of 0.895 g/cm$^3$ and MI of 3.5 dg/min (ExxonMobil Chemical Company, Houston, Tex.); and EXACT 8201, a copolymer of ethylene and 1-octene, the 1-octene derived units making up from 26 to 30 wt % of the plastomer, and having a density of 0.882 g/cm$^3$ and MI of 1.0 dg/min (ExxonMobil Chemical Company, Houston, Tex.).

In one aspect of the invention, a polybutene processing oil may be present in air barrier compositions. In one embodiment of the invention, the polybutene processing oil is a low molecular weight (less than 15,000 Mn) homopolymer or copolymer of olefin derived units having from 3 to 8 carbon atoms in one embodiment, preferably from 4 to 6 carbon atoms in another embodiment. In yet another embodiment, the polybutene is a homopolymer or copolymer of a $C_4$ raffinate. An embodiment of such low molecular weight polymers termed "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene").

In one embodiment of the invention, the polybutene processing oil is a copolymer of at least isobutylene derived units, 1-butene derived units, and 2-butene derived units. In one embodiment, the polybutene is a homopolymer, copolymer, or terpolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer of the three units, wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils useful in the invention typically have a number average molecular weight (Mn) of less than 10,000 in one embodiment, less than 8000 in another embodiment, and less than 6000 in yet another embodiment. In one embodiment, the polybutene oil has a number average molecular weight of greater than 400, and greater than 700 in another embodiment, and greater than 900 in yet another embodiment. A preferred embodiment can be a combination of any lower molecular weight limit with any upper molecular weight limit herein. For example, in one embodiment of the polybutene of the invention, the polybutene has a number average molecular weight of from 400 to 10,000, and from 700 to 8000 in another embodiment, and from 900 to 3000 in yet another embodiment. Useful viscosities of the polybutene processing oil ranges from 10 to 6000 cSt (centiStokes) at 100° C. in one embodiment, and from 35 to 5000 cSt at 100° C. in another embodiment, and is greater than 35 cSt at 100° C. in yet another embodiment, and greater than 100 cSt at 100° C. in yet another embodiment.

Commercial examples of such a processing oil are the PARAPOL™ Series of processing oils (ExxonMobil Chemical Company, Houston Tex.), such as PARAPOL™ 450, 700, 950, 1300, 2400 and 2500. The commercially available PARAPOL™ Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by gel permeation chromatography. The MWD of the PARAPOL™ oils range from 1.8 to 3 in one embodiment, and from 2 to 2.8 in another embodiment.

Below, Table 3 shows some of the properties of the PARAPOL™ oils useful in embodiments of the present invention, wherein the viscosity was determined as per ASTM D445-97, and the molecular weight by gel permeation chromatography.

TABLE 3

Properties of individual PARAPOL ™ Grades

| Grade | Mn | Viscosity @ 100° C., cSt |
|---|---|---|
| 450 | 420 | 10.6 |
| 700 | 700 | 78 |
| 950 | 950 | 230 |
| 1300 | 1300 | 630 |
| 2400 | 2350 | 3200 |
| 2500 | 2700 | 4400 |

Other properties of PARAPOL™ processing oils are as follows: the density (g/mL) of PARAPOL™ processing oils varies from about 0.85 (PARAPOL™ 450) to 0.91 (PARAPOL™ 2500). The bromine number (CG/G) for PARAPOL™ oils ranges from 40 for the 450 Mn processing oil, to 8 for the 2700 Mn processing oil.

The elastomeric composition of the invention may include one or more types of polybutene as a mixture, blended either prior to addition to the elastomer, or with the elastomer. The amount and identity (e.g., viscosity, Mn, etc.) of the polybutene processing oil mixture can be varied in this manner. Thus, PARAPOL™ 450 can be used when low viscosity is desired in the composition of the invention, while PARAPOL™ 2500 can be used when a higher viscosity is desired, or compositions thereof to achieve some other viscosity or molecular weight. In this manner, the physical properties of the composition can be controlled. More particularly, the phrases "polybutene processing oil", or "polybutene processing oil" include a single oil or a composition of two or more oils used to obtain any viscosity or molecular weight (or other property) desired, as specified in the ranges disclosed herein.

The polybutene processing oil or oils are present in the elastomeric composition of the invention from 1 to 60 phr in one embodiment, and from 2 to 40 phr in another embodiment, from 4 to 35 phr in another embodiment, and from 5 to 30 phr in yet another embodiment, and from 2 to 10 phr in yet another embodiment, and from 5 to 25 phr in yet another embodiment, and from 2 to 20 phr in yet another embodiment, wherein a desirable range of polybutene may be any upper phr limit combined with any lower phr limit described herein. Preferably, the polybutene processing oil does not contain aromatic groups or unsaturation.

The elastomeric compositions suitable to produce air barriers may also include a secondary rubber, or "general purpose rubber" component may be present in compositions and end use articles of the present invention. These rubbers may be blended by any suitable means with the elastomer or elastomer composition. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPR), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by *Subramaniam* in RUBBER TECHNOLOGY 179-208 (Maurice Morton, ed., Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646. In a desirable embodiment of the invention, natural rubber is present in the composition from 5 to 25 phr.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

Rubbers of ethylene and propylene derived units such as EPR and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers are described in THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. No. 5,162,445; U.S. Pat. No. 4,074,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. No. 4,703,091 and U.S. Pat. No. 4,632,963.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR, may be present from 5 phr to 40 phr in one embodiment, and from 8 to 30 phr in another embodiment, and from 10 to 25 phr in yet another embodiment, and from 5 to 25 phr in yet another embodiment, and from 5 to 15 phr in yet another embodiment, wherein a desirable range of NR may be any combination of any upper phr limit with any lower phr limit.

The elastomeric composition may have one or more filler components such as, for example, calcium carbonate, silica, clay and other silicates which may or may not be exfoliated, talc, titanium dioxide, and carbon black. In one embodiment, the filler is carbon black or modified carbon black, and combinations of any of these. In another embodiment, the filler is a blend of carbon black and silica. The preferred filler for such articles as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Carbon blacks suitable for innerliners and other air barriers include N550, N660, N650, N762, N990 an Regal 85.

When clay is present as a filler, it may be a swellable clay in one embodiment, which may or may not be exfoliated using an exfoliating agent. Swellable clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These swellable clays generally comprise particles containing a plurality of silicate platelets having a thickness of 8-12 Å, and contain exchangeable cations such as $Na^+$, $Ca^{+2}$, K or $Mg^{+2}$ present at the interlayer surfaces.

The swellable clay may be exfoliated by treatment with organic molecules (swelling or exfoliating "agents" or "additives") capable of undergoing ion exchange reactions with the cations present at the interlayer surfaces of the layered silicate. Suitable exfoliating agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^2$ is a $C_{14}$ to $C_{20}$ alkyl or alkene.

The fillers of the present invention may be any size and typically range, for example, from about 0.0001 μm to about 100 μm. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

One or more crosslinking agents are preferably used in the elastomeric compositions of the present invention, especially when silica is the primary filler, or is present in combination with another filler. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as "Si69") is employed.

Other processing aids may also be present in the compositions of the invention. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, polybutene aids, naphthenic oils, aromatic oils, waxes, resins, rosins, and the like. The aid is typically present from 1 to 70 phr in one embodiment, from 3 to 60 phr in another embodiment, and from 5 to 50 phr in yet another embodiment. Some commercial examples of processing aids are SUNDEX™ (Sun Chemicals), a naphthenic processing oil, PARAPOL™ (ExxonMobil Chemical Company), a polybutene processing oil having a number average molecular weight of from 800 to 3000, and FLEXON™ (ExxonMobil Chemical Company), a paraffinic petroleum oil. In one embodiment of the invention, paraffinic, naphthenic and aromatic oils are substantially absent, meaning, they have not been deliberately added to the compositions used to make the air barriers, or, in the alternative, if present, are only present up to 0.2 wt % of the compositions used to make the air barriers. In another embodiment of compositions of the invention, naphthenic and aromatic oils are substantially absent. Commercial examples of these include, for example, FLEXON oils (which contain some aromatic moieties) and CALSOL oils (a naphthenic oil).

The compositions produced in accordance with the present invention typically contain other components and additives customarily used in rubber mixes, such as effective amounts of other nondiscolored and nondiscoloring processing aids, pigments, accelerators, crosslinking and curing materials, antioxidants, antiozonants. General classes of accelerators include amines, diamines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems or resin cure systems may also be used. The components, and other curatives, are typically present from 0.1 to 10 phr in the composition. Heat or radiation-induced crosslinking of polymers may be used.

Generally, polymer blends, for example, those used to produce tires, are crosslinked thereby improve the polymer's mechanical properties. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, 18-23 (1991)).

Sulfur is the most common chemical vulcanizing agent for diene-containing elastomers. It exists as a rhombic 8-member ring or in amorphous polymeric forms. The sulfur vulcanization system also consists of the accelerator to activate the sulfur, an activator, and a retarder to help control the rate of vulcanization. Accelerators serve to control the onset of and rate of vulcanization, and the number and type of sulfur crosslinks that are formed. These factors play a significant role in determining the performance properties of the vulcanizate.

Activators are chemicals that increase the rate of vulcanization by reacting first with the accelerators to form rubber-soluble complexes which then react with the sulfur to form sulfurating agents. Retarders may be used to delay the initial onset of cure in order to allow sufficient time to process the unvulcanized rubber.

Halogen-containing elastomers such as halogenated star-branched butyl rubber, brominated butyl rubber, chlorinated butyl rubber, star-branched brominated butyl(polyisobutylene/isoprene copolymer) rubber, halogenated poly(isobutylene-co-p-methylstyrene), polychloroprene, and chlorosulfonated polyethylene may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction.

Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD 25-30 (1993)). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

The materials included in the air barriers and air barrier compositions are mixed by conventional means known to those skilled in the art, in a single step or in stages. In one embodiment, the carbon black is added in a different stage from zinc oxide and other cure activators and accelerators. In another embodiment, antioxidants, antiozonants and processing materials are added in a stage after the carbon black has been processed with the elastomeric composition, and zinc oxide is added at a final stage to maximize compound modulus. Thus, a two to three (or more) stage processing sequence is preferred. Additional stages may involve incremental additions of filler and processing oils.

The compositions may be vulcanized by subjecting them using heat or radiation according to any conventional vulcanization process. Typically, the vulcanization is conducted at a temperature ranging from about 100° C. to about 250° C. in one embodiment, from 150° C. to 200° C. in another embodiment, for about 1 to 150 minutes.

Suitable elastomeric compositions for such articles as air barriers, and more particularly tire curing bladders, tire innerliners, tire innertubes, air sleeves, and other industrial products including gaskets and ring structures, may be prepared by using conventional mixing techniques including, for example, kneading, roller milling, extruder mixing, internal mixing (such as with a Banbury™ or Brabender™ mixer) etc. The sequence of mixing and temperatures employed are well known to the skilled rubber compounder, the objective being the dispersion of fillers, activators and curatives in the polymer matrix without excessive heat buildup. A useful mixing procedure utilizes a Banbury™ mixer in which the copolymer rubber, carbon black or filler system and plasticizer are added and the composition mixed for the desired time or to a particular temperature to achieve adequate dispersion of the ingredients. Alternatively, the rubber and a portion of the carbon black/filler (e.g., one-third to two thirds) is mixed for a short time (e.g., about 1 to 3 minutes) followed by the remainder of the carbon black/filler and oil. Mixing is continued for about 1 to 10 minutes at high rotor speed during which time the mixed components reach a temperature of about 140-160° C. Following cooling, the components are mixed in a second step on a rubber mill or in a Banbury™ mixer during which the curing agent and optional accelerators, are thoroughly and uniformly dispersed at relatively low temperature, for example, about 80° C. to about 105° C., to avoid premature curing of the composition. Variations in mixing will be readily apparent to those skilled in the art and the present invention is not limited to any specific mixing procedure. The mixing is performed to disperse all components of the composition thoroughly and uniformly.

An innerliner stock is then prepared for example by calendering the compounded rubber composition into sheet material having a thickness of roughly 30 to 80 mil gauge and cutting the sheet material into strips of appropriate width and length for innerliner applications. The innerliner stock may also be extruded and cut at the tire building machine.

The sheet stock at this stage of the manufacturing process is a sticky, uncured mass and is therefore subject to deformation and tearing as a consequence of handling and cutting operations associated with tire construction.

The innerliner is then ready for use as an element in the construction of a pneumatic tire. The pneumatic tire is composed of a layered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix and an innerliner layer which is laminated to the inner surface of the carcass layer. Tires are normally built on a tire forming drum using the layers described above. After the uncured tire has been built on the drum, the uncured tire is placed in a heated mold having an inflatable tire shaping bladder to shape it and heat it to vulcanization temperatures by methods well known in the art. Vulcanization temperatures generally range from about 100° C. to about 250° C., more preferably from 125° C. to 200° C., and times may range from about one minute to several hours, more preferably from about 5 to 30 minutes. Vulcanization of the assembled tire results in vulcanization of all elements of the tire assembly, for example, the innerliner, the carcass and the outer tread/sidewall layers and enhances the adhesion between these elements, resulting in a cured, unitary tire from the multi-layers.

Thus, one aspect of the invention is a composition suitable for an air barrier comprising an elastomer comprising $C_4$ to $C_7$ isoolefin derived units; and a plastomer, wherein the plastomer is a copolymer of ethylene derived units and $C_3$ to $C_{10}$ α-olefin derived units, the plastomer having a density of less than 0.915 g/cm$^3$. Further, naphthenic and aromatic oils are substantially absent from the composition in one embodiment.

In another embodiment, the plastomer comprises ethylene derived units and from 10 wt % to 30 wt % of $C_3$ to $C_{10}$ α-olefin derived units. In yet another embodiment, the plastomer comprises ethylene derived units and from 10 wt % to 30 wt % of units selected from 1-butene, 1-hexene and 1-octene derived units. In yet another embodiment, the plastomer comprises ethylene derived units and from 10 wt % to 30 wt % of octene derived units. The plastomer may possess a melt index of from 0.1 to 20 dg/min, and from 0.1 to 10 dg/min in another embodiment.

In one embodiment, the plastomer is present in the composition from 2 to 20 phr, and from 10 to 15 phr in another embodiment.

In another aspect of the composition, the composition also comprises a processing oil. The oil is selected from paraffinic oils and polybutene processing oils, and mixtures thereof in one embodiment, and is a polybutene oil in another embodiment. The processing oil is present from 2 to 20 phr in one embodiment, and from 5 to 18 phr in another embodiment. Rosin oils may be present in compositions of the invention from 0.1 to 5 phr in one embodiment, and from 0.2 to 2 phr in another embodiment. Desirably, oils and processing aids comprising unsaturation comprise less than 2 phr of the compositions of the invention in one embodiment.

The composition may also include a filler selected from carbon black, modified carbon black, silicates, clay, exfoliated clay, and mixtures thereof.

In another embodiment, the composition also comprises a secondary rubber selected from natural rubbers, polyisoprene rubber, styrene-butadiene rubber (SBR), polybutadiene rubber, isoprene-butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, poly(isobutylene-co-p-methylstyrene), halogenated poly(isobutylene-co-p-methylstyrene), poly(isobutylene-co-cyclopentadiene), halogenated poly (isobutylene-co-cyclopentadiene), and mixtures thereof. In another embodiment, the composition also comprises from 5 to 30 phr of a natural rubber.

The elastomer useful in the present invention comprises $C_4$ to $C_7$ isoolefin derived units. The $C_4$ to $C_7$ isoolefin derived units may be selected from isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene.

Further, the elastomer also comprises multiolefin derived units selected from isoprene, butadiene, 2,3-dimethyl-1,3-butadiene, myrcene, 6,6-dimethyl-fulvene, hexadiene, cyclopentadiene, and piperylene in another embodiment.

In yet another embodiment of a useful elastomer, the elastomer also comprises styrenic derived units selected from styrene, chlorostyrene, methoxystyrene, indene and indene derivatives, α-methylstyrene, o-methylstyrene, m-methylstyrene, and p-methylstyrene, and p-tert-butylstyrene.

The composition of the invention may also be cured using a curative. In one embodiment, the composition also comprises a curative selected from sulfur, sulfur-based compounds, metal oxides, metal oxide complexes, fatty acids, peroxides, diamines, and mixtures thereof.

The cured composition has desirable properties as an air barrier. For example, in one embodiment the composition has a brittleness value of less than −41.0° C. In another embodiment, the composition has a Shore A Hardness at 25° C. of less than 55. In yet another embodiment, the composition has an air permeability at 65° C. of less than $3.50 \times 10^{-8}$ $cm^3$-cm/$cm^2$-sec-atm. And in yet another embodiment, the composition has an Adhesion to Carcass value of greater than 4 N/mm.

The composition can be used to make any number of articles. In one embodiment, the article is selected from tire curing bladders, innerliners, tire innertubes, and air sleeves. Other useful goods that can be made using compositions of the invention include hoses, seals, molded goods, cable housing, and other articles disclosed in THE VANDERBILT RUBBER HANDBOOK 637-772 (R.T. Vanderbilt Company, Inc. 1990).

Thus, the compositions of the present invention can be described alternately by any of the embodiments disclosed herein. For example, an aspect of the present invention may be described as a composition suitable for an air barrier comprising from 5 to 25 phr polybutene processing oil; halogenated star-branched butyl rubber; from 5 to 25 phr natural rubber; and from 5 to 25 phr of a plastomer, wherein the plastomer is a copolymer of ethylene derived units and $C_3$ to $C_{10}$ α-olefin derived units, the plastomer having a density of less than 0.915 $g/cm^3$; and the composition having a Brittleness value of less than −41.0° C.

In another embodiment, the composition suitable for an air barrier consists essentially of an elastomer comprising $C_4$ to $C_7$ isoolefin derived units; and a plastomer, wherein the plastomer is a copolymer of ethylene derived units and $C_3$ to $C_{10}$ α-olefin derived units, the plastomer having a density of less than 0.915 $g/cm^3$. In this embodiment, other minor components such as rosin oil, curatives and accelerators may also be present, individually, from 0.1 to 5 phr. And in yet another embodiment, the composition suitable for an air barrier consists essentially of an elastomer comprising $C_4$ to $C_7$ isoolefin derived units; and a plastomer, wherein the plastomer is a copolymer of ethylene derived units and $C_3$ to $C_{10}$ α-olefin derived units, the plastomer having a density of less than 0.915 $g/cm^3$; and a polybutene processing oil. In this embodiment, other minor components such as rosin oil, curatives and accelerators may also be present, individually, from 0.1 to 5 phr.

The following examples reflect embodiments of the invention and are by no means intended to be limiting of the scope of the invention.

PROPHETIC EXAMPLES

Test Methods

Cure properties will be measured using a MDR 2000 at the indicated temperature and 0.5 degree arc. Test specimens will be cured at the indicated temperature, typically at 160° C., for a time corresponding to $T_c$90+appropriate mold lag. When possible, standard ASTM tests will be used to determine the cured compound physical properties. Stress/strain properties (tensile strength, elongation at break, modulus values, energy to break) will be measured at room temperature using an Instron 4202. Shore A hardness was measured at room temperature by using a Zwick Duromatic. The error (2σ) in measuring 100% Modulus is ±0.11 MPa units; the error (2σ) in measuring elongation is ±13% units.

The values "MH" and "ML" used here and throughout the description refer to "maximum torque" and "minimum torque", respectively. The "MS" value is the Mooney scorch value, the "ML(1+4)" value is the Mooney viscosity value. The error (2σ) in the later measurement is ±0.65 Mooney viscosity units. The values of "Tc" are cure times in minutes, and "Ts" is scorch time".

Molecular weight of the PARAPOL™ polybutene processing oil will be determined by gel permeation chromatography, and the values of number average molecular weight (Mn) obtained have an error of ±20%. The techniques for determining the molecular weight (Mn and Mw) and molecular weight distribution (MWD) are generally described in U.S. Pat. No. 4,540,753 to Cozewith et al. and references cited therein, and in Verstrate et al., 21 MACROMOLECULES 3360 (1988). In a typical measurement, a 3-column set is operated at 30° C. The elution solvent used may be stabilized tetrahydrofuran (THF), or 1,2,4-trichlorobenzene (TCB). The columns are calibrated using polystyrene standards of precisely known molecular weights. A correlation of polystyrene retention volume obtained from the standards, to the retention volume of the polymer tested yields the polymer molecular weight. The viscosity of the PARAPOL™ polybutene processing oil will be determined as per ASTM D445-97.

Tensile measurements will be done at ambient temperature on Instron Series IX Automated Materials Testing System 6.03.08. Micro tensile specimens (dog-bone shaped) width of 0.08 inches (0.20 cm) and a length of 0.2 inches (0.5 cm) length (between two tabs) will be used. The thickness of the specimens varied and will be measured manually by Mitutoyo Digimatic Indicator connected to the system computer. The specimens will be pulled at a crosshead speed of 20 inches/min. (51 cm/min.) and the stress/strain data will be recorded. The average stress/strain value of at least three specimens is reported. The error (2σ) in tensile measurements is ±0.47 MPa units.

Oxygen permeability will be measured using a MOCON OxTran Model 2/61 operating under the principle of dynamic measurement of oxygen transport through a thin film as published by R. A. Pasternak et al. in 8 JOURNAL OF POLYMER SCIENCE: PART A-2 467 (1970). The units of measure are cc-mil/$m^2$-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Air permeability will be tested by the following method. Thin, vulcanized test specimens from the sample compositions will be mounted in diffusion cells and conditioned in an oil bath at 65° C. The time required for air to permeate through a given specimen is recorded to determine its air permeability. Test specimens will be circular plates with 12.7-cm diameter and 0.38-mm thickness. The error (2σ) in measuring air permeability is ±0.245 ($\times 10^8$) units. Other test methods are described in Table 4.

Example 1

The present invention is the application of butyl rubber made according to the inventive synthetic steps described herein in a rubber compound whose composition is suitable for use as an innertube in bicycle, passenger car, truck, bus and other vehicles. While not meant to be limiting by, it may be better understood by reference to the following example compositions and Tables. The components expected to be used and their commercial sources are outlined in Table 5, the proposed experimental compositions in the Examples are in Table 6 in parts per hundred rubber (phr), and the anticipated experimental properties relative to those compositions to butyl rubber made by current commercial methods are summarized in Table 7 wherein the results for compounds using commercial butyl rubber are assigned a value of 100, and improvements are denoted by increase in values.

The example compositions will be mixed by techniques common in the art, the components and their relative amounts listed in Table 6. Particularly, the first pass of components will be mixed at 80 rpm in a BANBURY™ size BR mixer at 40 psi RAM pressure with the temperature control unit set at about 66° C. The elastomer will be added at time zero. Carbon black and resins will be added at about 30 seconds of mixing, and oil and remaining ingredients will be added when the rubber mix reached a temperature of about 110° C. After an additional 1 minute of mixing, the mixer will be scraped down, and will be dumped at about 135° C. Samples will be finalized on a mill by addition of the curatives to the masterbatch from the first step of mixing.

The anticipated data in Table 7 will show that the use of butyl rubber made by the present invention is expected to afford equivalent or even improved air barrier qualities compared to current commercial butyl rubbers as well as being expected to maintain the desirable cure, physical and aged physical properties, while also being expected to maintain the desirable processability as will be determined in the Mooney viscosity and scorch values. The data in Table 7 is expected to also show that the use of polybutene processing oil will improve the air barrier qualities of butyl rubbers made by the present invention as well as the expected improvements in aged properties, while also being expected to maintain the desirable processability as determined in the Mooney viscosity and scorch values.

TABLE 4

Test Methods

| Parameter | Units | Test |
|---|---|---|
| Mooney Viscosity (polymer) | ML 1 + 8, 125° C., MU | ASTM D 1646 (modified) |
| Air permeability | $cm^3$-cm/$cm^2$-sec-atm | See text |
| Brittleness | ° C. | ASTM D 746 |
| Green Strength (100% Modulus) | PSI | ASTM D 412 |
| Mooney Viscosity (compound) | ML1 + 4, 100° C., MU | ASTM D 1646 |
| Mooney Scorch Time | $T_s5$, 125° C., minutes | ASTM D 1646 |
| Moving Die Rheometer (MDR) @ 160° C., ±0.5° arc | | |
| ML | deciNewton · meter | |
| MH | dNewton · m | |
| $T_s2$ | minute | |
| $T_c90$ | minute | |
| Cure rate | dN · m/minute | ASTM D 2084 |
| Physical Properties press cured Tc 90 + 2 min @ 160° C. | | |
| Hardness | Shore A | ASTM D 2240 |
| Modulus 100% | MPa | ASTM D 412 die C |
| Tensile Strength | MPa | |

TABLE 4-continued

Test Methods

| Parameter | Units | Test |
|---|---|---|
| Elongation at Break | % | |
| Hot Air Aging, 72 hrs. @ 125° C. | | ASTM D 573 |
| Hardness Change | % | |
| Tensile Change | % | |
| Elongation Change | % | |
| Weight Change | % | |
| Tear Strength Die B | N/mm | ASTM D 624 |

TABLE 5

Components and Commercial Sources

| Component | Brief Description | Commercial Source |
|---|---|---|
| BUTYL 268 | Poly(isobutylene-co-isoprene) | ExxonMobil Chemical Company (Houston, TX) |
| BROMOBUTYL 2222 | Brominated butyl rubber, 27-37 Mooney Viscosity | ExxonMobil Chemical Company (Houston, TX) |
| EXXPRO ™ 03-1 | 10 wt % PMS, 0.85 mol % BrPMS, Mooney viscosity of 35 ± 5 MU (1 + 8, 125° C.) | ExxonMobil Chemical Company (Houston, TX) |
| CLOISITE ™— 20A | Dimethylditallowammonium chloride modified montmorillonite clay | Southern Clay Products (Gonzalez, TX) |
| SP-1068 | Alkyl Phenol Formaldehyde Resin | Schenectady Int. (Schenectady, NY) |
| CALSOL ™ 810 | Naphthenic Oil ASTM Type 103 | R. E. Carroll, Inc (Trenton, NJ) |
| CAPTAX ™ | 2-mercaptobenzothiazole | R. T. Vanderbilt |
| KADOX ™ 930 | High Purity French Process Zinc Oxide | Zinc Corp. of America (Monaca, Pa) |
| PARAPOL ™ | $C_4$ raffinate | ExxonMobil Chemical Company (Houston, TX) |
| STRUKTOL ™ 40 MS | Composition of aliphatic-aromatic-naphthenic resins | Struktol Co. of America (Stow, Ohio) |
| Stearic acid | Cure agent | e.g., C. K. Witco Corp. (Taft, LA) |
| Sulfur | Cure agent | e.g., R. E. Carroll (Trenton, NJ) |
| TMTD | Tetramethylthiuram disulfide | e.g., R. T. Vanderbilt (Norwalk, CT) |

TABLE 6

Elastomeric Compositions

| Components (phr) | 1 | 2 | 3 | 4 |
|---|---|---|---|---|
| BUTYL 268 | 100 | — | 100 | — |
| EXPT BUTYL | — | 100 | — | 100 |
| Carbon Black, N660 | 70 | 70 | 70 | 70 |
| CALSOL ™ 810 | 25 | 25 | — | — |
| Stearic Acid | 1 | 1 | 1 | 1 |
| Zinc Oxide | 5 | 5 | 5 | 5 |
| PARAPOL ™ 2400 | — | — | 25 | 25 |
| Sulfur | 2 | 2 | 2 | 2 |
| CAPTAX ™ | 0.5 | 0.5 | 0.5 | 0.5 |
| TMTD | 1 | 1 | 1 | 1 |
| TOTAL | 204.5 | 204.5 | 204.5 | 204.5 |

TABLE 7

Cure, Physical and Aged Properties

| Components (phr) | 1 | 2 | 3 | 4 |
|---|---|---|---|---|
| Mooney viscosity @100° C. ML(1 + 4) | 100 | 95-110 | 100 | 95-110 |
| Mooney Scorch @ 135° C., T10, min | 100 | 95-110 | 100 | 95-110 |
| MDR, 0.5° Arc @ 160° C. | | | | |
| MH-ML | 100 | 95-110 | 100 | 95-110 |
| MH | 100 | 95-110 | 100 | 95-110 |
| ML | 100 | 95-110 | 100 | 95-110 |
| Ts2, min | 100 | 95-110 | 100 | 95-110 |
| Tc50, min | 100 | 95-110 | 100 | 95-110 |
| Tc90, min | 100 | 95-110 | 100 | 95-110 |
| Tensile, Cure— 8 mins @160° C. | | | | |
| Hardness @25° C. | 100 | 95-110 | 100 | 95-110 |
| 100% Modulus, MPa | 100 | 95-110 | 100 | 95-110 |
| 300% Modulus, MPa | 100 | 95-110 | 100 | 95-110 |
| Tensile, MPa | 100 | 95-110 | 100 | 95-110 |
| Elongation, % | 100 | 95-110 | 100 | 95-110 |
| Aged Tensile, 72 Hrs @125° C. | | | | |
| Hardness @25° C. | 100 | 95-110 | 100 | 95-110 |
| 100% Modulus, MPa | 100 | 95-110 | 100 | 95-110 |
| 300% Modulus, MPa | 100 | 95-110 | 100 | 95-110 |
| Tensile, MPa | 100 | 95-110 | 100 | 95-110 |
| Elongation, % | 100 | 95-110 | 100 | 95-110 |
| Die B Tear, N/mm | 100 | 95-110 | 100 | 95-110 |
| Die B Tear-Aged 72 Hrs @125° C. | 100 | 95-110 | 100 | 95-110 |
| Mocon @ 60° C. | 100 | 95-110 | 200 | 200 |

Example 2

The present invention is the application of bromobutyl rubber made according to the inventive synthetic steps described herein in a rubber compound whose composition is suitable for use as an innerliner of tires for bicycle, passenger car, truck, bus, aircraft, farm and other vehicles.

The example compositions will be mixed by techniques common in the art, the components and their relative amounts listed in Table 8. Particularly, the first pass of components will be mixed at 80 rpm in a BANBURY™ size BR mixer at 40 psi RAM pressure with the temperature control unit set at about 66° C. The elastomer will be added at time zero. Carbon black, clay and resins will be added at about 30 seconds of mixing, and oil and remaining ingredients will be added when the rubber mix reached a temperature of about 110° C. After an additional 1 minute of mixing, the mixer will be scraped down, and will be dumped at about 135° C. Samples will be finalized in the BANBURY™ size BR mixer at 60 rpm and 40 psi RAM pressure with the temperature control unit set for maximum cooling at about 30° C. during a second mixing step by addition of the curatives to the masterbatch from the first step of mixing.

The anticipated data in Table 9 is expected to show that the use of bromobutyl rubber made by the present invention will afford equivalent or even improved air barrier qualities compared to current commercial bromobutyl rubbers as well as being expected to maintain the desirable cure, physical and aged physical properties, while also being expected to maintain the desirable processability as will be determined in the Mooney viscosity and scorch values. The anticipated data in Table 9 is also expected to show that the use of polybutene processing oil will improve the air barrier qualities of bromobutyl rubbers made by the present invention as well as being expected to improve the aged properties, while also being expected to maintain the desirable processability as will be determined in the Mooney viscosity and scorch values. The data in Table 9 is also expected to show that the use of plastomers will also improve the air barrier qualities of bromobutyl rubbers made by the present invention as well as being expected to maintain the desirable processability as will be determined by the Mooney viscosity and scorch values.

The air retention values for the compositions are expected to show improvements when the polybutene processing oil and/or plastomer are present in the composition with the polymers of the present invention.

TABLE 8

Elastomeric Compositions

| Component (phr) | 5 | 6 | 7 | 8 | 9 | 10 |
|---|---|---|---|---|---|---|
| BROMOBUTYL 2222 | 100 | — | 100 | — | — | — |
| EXPT BROMOBUTYL | — | 100 | — | 100 | 100 | 100 |
| Carbon Black, N660 | 60 | 60 | 60 | 60 | 60 | 60 |
| CALSOL ™ 810 | 8 | 8 | — | — | — | — |
| PARAPOL ™ 2400 | — | — | 8 | 8 | 4 | — |
| STRUKTOL ™ 40MS | 7 | 7 | 7 | 7 | 7 | 7 |
| SP-1068 | 4 | 4 | 4 | 4 | 4 | 4 |
| Stearic Acid | 2 | 2 | 2 | 2 | 2 | 2 |
| EXACT ™ 8201 | — | — | — | — | 4 | 8 |
| Zinc Oxide | 3 | 3 | 3 | 3 | 3 | 3 |
| MBTS | 1.5 | 1.5 | 1.5 | 1.5 | 1.5 | 1.5 |
| Sulfur | 0.5 | 0.5 | 0.5 | 0.5 | 0.5 | 0.5 |

TABLE 9

Cure, Physical and Aged Properties

| Components (phr) | 5 | 6 | 7 | 8 | 9 | 10 |
|---|---|---|---|---|---|---|
| Mooney viscosity @100° C. ML(1 + 4) | 100 | 95-110 | 100 | 95-110 | 95-110 | 95-110 |
| Mooney Scorch @ 135° C., T10, min | 100 | 95-110 | 100 | 95-110 | 95-110 | 95-110 |
| MDR, 0.5° Arc @ 160° C. | | | | | | |
| MH-ML | 100 | 95-110 | 100 | 95-110 | 95-110 | 95-110 |
| MH | 100 | 95-110 | 100 | 95-110 | 95-110 | 95-110 |
| ML | 100 | 95-110 | 100 | 95-110 | 95-110 | 95-110 |
| Ts2, min | 100 | 95-110 | 100 | 95-110 | 95-110 | 95-110 |

TABLE 9-continued

Cure, Physical and Aged Properties

| Components (phr) | 5 | 6 | 7 | 8 | 9 | 10 |
|---|---|---|---|---|---|---|
| Tc50, min | 100 | 95-110 | 100 | 95-110 | 95-110 | 95-110 |
| Tc90, min | 100 | 95-110 | 100 | 95-110 | 95-110 | 95-110 |
| Tensile, Cure— 8 mins @160° C. | | | | | | |
| Hardness @25° C. | 100 | 95-110 | 100 | 95-110 | 95-110 | 95-110 |
| 100% Modulus, MPa | 100 | 95-110 | 100 | 95-110 | 95-110 | 95-110 |
| 300% Modulus, MPa | 100 | 95-110 | 100 | 95-110 | 95-110 | 95-110 |
| Tensile, MPa | 100 | 95-110 | 100 | 95-110 | 95-110 | 95-110 |
| Elongation, % | 100 | 95-110 | 100 | 95-110 | 95-110 | 95-110 |
| Aged Tensile, 72 Hrs @125° C. | | | | | | |
| Hardness @25° C. | 100 | 95-110 | 100 | 95-110 | 95-110 | 95-110 |
| 100% Modulus, MPa | 100 | 95-110 | 100 | 95-110 | 95-110 | 95-110 |
| 300% Modulus, MPa | 100 | 95-110 | 100 | 95-110 | 95-110 | 95-110 |
| Tensile, MPa | 100 | 95-110 | 100 | 95-110 | 95-110 | 95-110 |
| Elongation, % | 100 | 95-110 | 100 | 95-110 | 95-110 | 95-110 |
| Die B Tear, N/mm | 100 | 95-110 | 100 | 95-110 | 95-110 | 95-110 |
| Die B Tear-Aged 72 Hrs @125° C. | 100 | 95-110 | 100 | 95-110 | 95-110 | 95-110 |
| Mocon @ 60° C. | 100 | 95-110 | 125 | 125-135 | 125-135 | 150 |

Example 3

The present invention is the application of bromobutyl rubber made according to the inventive synthetic steps described herein in a rubber compound whose composition is suitable for use as an innerliner of tires for bicycle, passenger car, truck, bus, aircraft, farm and other vehicles.

The example compositions will be mixed by techniques common in the art, the components and their relative amounts listed in Table 10. Particularly, the first pass of components will be mixed at 80 rpm in a Krupp internal mixer with intermeshing rotor blades at 40 psi RAM pressure with the temperature control unit set at about 66° C. The elastomer will be added at time zero. Carbon black, clay and resins will be added at about 30 seconds of mixing, and oil and remaining ingredients will be added when the rubber mix reaches a temperature of about 110° C. After an additional 1 minute of mixing, the mixer will be scraped down, and will be dumped at about 135° C. Samples will be finalized in the Krupp internal mixer at 60 rpm and 40 psi RAM pressure with the temperature control unit set for maximum cooling at about 30° C. during a second mixing step by addition of the curatives to the masterbatch from the first step of mixing.

The anticipated data in Table 11 is expected to show that the use of bromobutyl rubber made by the present invention will afford equivalent or even improved air barrier qualities compared to current commercial bromobutyl rubbers as well as being expected to maintain the desirable cure, physical and aged physical properties, while also being expected to maintain the desirable processability as will be determined in the Mooney viscosity and scorch values. The anticipated data in Table 11 is also expected to show that the use of polybutene processing oil will improve the air barrier qualities of bromobutyl rubbers made by the present invention as well as being expected to improve the aged properties, while also being expected to maintain the desirable processability as will be determined in the Mooney viscosity and scorch values. The data in Table 11 is also expected to show that the use of nonoclays will also improve the air barrier qualities of bromobutyl rubbers made by the present invention as well as being expected to maintain the desirable processability as will be determined by the Mooney viscosity and scorch values.

The air retention values for the compositions are expected to show improvements when the polybutene processing oil and/or nanoclay are present in the composition with the polymers of the present invention.

TABLE 10

Elastomeric Compositions

| Component (phr) | 11 | 12 | 13 | 14 | 15 | 16 |
|---|---|---|---|---|---|---|
| BROMOBUTYL 2222 | 100 | 100 | 100 | — | — | — |
| EXPT BROMOBUTYL | — | — | — | 100 | 100 | 100 |
| Carbon Black, N660 | 60 | 60 | 60 | 60 | 60 | 60 |
| Nanoclay, CLOSITE ™ 20A | — | 4 | 4 | — | 4 | 4 |
| CALSOL ™ 810 | 8 | 8 | — | 8 | 8 | — |
| PARAPOL ™ 2400 | — | — | 8 | — | — | 8 |
| STRUKTOL ™ 40MS | 7 | 7 | 7 | 7 | 7 | 7 |
| SP-1068 | 4 | 4 | 4 | 4 | 4 | 4 |
| Stearic Acid | 2 | 2 | 2 | 2 | 2 | 2 |
| Zinc Oxide | 3 | 3 | 3 | 3 | 3 | 3 |
| MBTS | 1.5 | 1.5 | 1.5 | 1.5 | 1.5 | 1.5 |
| Sulfur | 0.5 | 0.5 | 0.5 | 0.5 | 0.5 | 0.5 |

TABLE 11

Cure, Physical and Aged Properties

| Components (phr) | 11 | 12 | 13 | 14 | 15 | 16 |
|---|---|---|---|---|---|---|
| Mooney viscosity @100° C. ML(1 + 4) | 100 | 100 | 100 | 95-110 | 95-110 | 95-110 |
| Mooney Scorch @ 135° C., T10, min | 100 | 100 | 100 | 95-110 | 95-110 | 95-110 |
| MDR, 0.5° Arc @ 160° C. | | | | | | |
| MH-ML | 100 | 100 | 100 | 95-110 | 95-110 | 95-110 |
| MH | 100 | 100 | 100 | 95-110 | 95-110 | 95-110 |
| ML | 100 | 100 | 100 | 95-110 | 95-110 | 95-110 |
| Ts2, min | 100 | 100 | 100 | 95-110 | 95-110 | 95-110 |

TABLE 11-continued

Cure, Physical and Aged Properties

| Components (phr) | 11 | 12 | 13 | 14 | 15 | 16 |
|---|---|---|---|---|---|---|
| Tc50, min | 100 | 100 | 100 | 95-110 | 95-110 | 95-110 |
| Tc90, min | 100 | 100 | 100 | 95-110 | 95-110 | 95-110 |
| Tensile, Cure— 8 mins @160° C. | | | | | | |
| Hardness @25° C. | 100 | 100 | 100 | 95-110 | 95-110 | 95-110 |
| 100% Modulus, MPa | 100 | 100 | 100 | 95-110 | 95-110 | 95-110 |
| 300% Modulus, MPa | 100 | 100 | 100 | 95-110 | 95-110 | 95-110 |
| Tensile, MPa | 100 | 100 | 100 | 95-110 | 95-110 | 95-110 |
| Elongation, % | 100 | 100 | 100 | 95-110 | 95-110 | 95-110 |
| Aged Tensile, 72 Hrs @125° C. | | | | | | |
| Hardness @25° C. | 100 | 100 | 100 | 95-110 | 95-110 | 95-110 |
| 100% Modulus, MPa | 100 | 100 | 100 | 95-110 | 95-110 | 95-110 |
| 300% Modulus, MPa | 100 | 100 | 100 | 95-110 | 95-110 | 95-110 |
| Tensile, MPa | 100 | 100 | 100 | 95-110 | 95-110 | 95-110 |
| Elongation, % | 100 | 100 | 100 | 95-110 | 95-110 | 95-110 |
| Die B Tear, N/mm | 100 | 100 | 100 | 95-110 | 95-110 | 95-110 |
| Die B Tear-Aged 72 Hrs @125° C. | 100 | 100 | 100 | 95-110 | 95-110 | 95-110 |
| Mocon @ 60° C. | 100 | 110 | 125 | 95-110 | 120 | 150 |

Example 4

The present invention is the application of brominated-isobutylene-co-para-methylstyrene rubber made according to the inventive synthetic steps described herein in a rubber compound whose composition is suitable for use as an innerliner of tires for bicycle, passenger car, truck, bus, aircraft, farm and other vehicles.

The example compositions will be mixed by techniques common in the art, the components and their relative amounts listed in Table 12. Particularly, the first pass of components will be mixed at 80 rpm in a Krupp internal mixer with intermeshing rotor blades at 40 psi RAM pressure with the temperature control unit set at about 66° C. The elastomer will be added at time zero. Carbon black, clay and resins will be added at about 30 seconds of mixing, and oil and remaining ingredients will be added when the rubber mix reaches a temperature of about 110° C. After an additional 1 minute of mixing, the mixer will be scraped down, and will be dumped at about 135° C. Samples will be finalized in the Krupp internal mixer at 60 rpm and 40 psi RAM pressure with the temperature control unit set for maximum cooling at about 30° C. during a second mixing step by addition of the curatives to the masterbatch from the first step of mixing.

The anticipated data in Table 13 is expected to show that the use of the brominated-isobutylene-co-para-methylstyrene made by the present invention will afford equivalent or even improved air barrier qualities compared to currently produced brominated-isobutylene-co-para-methylstyrene rubbers as well as being expected to maintain the desirable cure, physical and aged physical properties, while also being expected to maintain the desirable processability as will be determined in the Mooney viscosity and scorch values. The anticipated data in Table 13 is also expected to show that the use of polybutene processing oil will improve the air barrier qualities of bromobutyl rubbers made by the present invention as well as being expected to improve the aged properties, while also being expected to maintain the desirable processability as will be determined in the Mooney viscosity and scorch values. The data in Table 13 is also expected to show that the use of nonoclays will also improve the air barrier qualities of bromobutyl rubbers made by the present invention as well as being expected to maintain the desirable processability as will be determined by the Mooney viscosity and scorch values.

The air retention values for the compositions are expected to show improvements when the polybutene processing oil and/or nanoclay are present in the composition with the polymers of the present invention.

TABLE 12

Elastomeric Compositions

| Component (phr) | 17 | 18 | 19 | 20 | 21 | 22 |
|---|---|---|---|---|---|---|
| EXXPRO ™ 03-1 | 100 | 100 | 100 | — | — | — |
| EXPT BROMINATED-ISOBUTYLENE-CO-PARA-METHYLSTYRENE | — | — | — | 100 | 100 | 100 |
| Carbon Black, N660 | 60 | 60 | 60 | 60 | 60 | 60 |
| Nanoclay, CLOSITE ™ 20A | — | 4 | 4 | — | 4 | 4 |
| CALSOL ™ 810 | 8 | 8 | — | 8 | 8 | — |
| PARAPOL ™ 2400 | — | — | 8 | — | — | 8 |
| STRUKTOL ™ 40MS | 7 | 7 | 7 | 7 | 7 | 7 |
| SP-1068 | 4 | 4 | 4 | 4 | 4 | 4 |
| Stearic Acid | 2 | 2 | 2 | 2 | 2 | 2 |
| Zinc Oxide | 3 | 3 | 3 | 3 | 3 | 3 |
| MBTS | 1.5 | 1.5 | 1.5 | 1.5 | 1.5 | 1.5 |
| Sulfur | 0.5 | 0.5 | 0.5 | 0.5 | 0.5 | 0.5 |

TABLE 13

Cure, Physical and Aged Properties

| Components (phr) | 11 | 12 | 13 | 14 | 15 | 16 |
|---|---|---|---|---|---|---|
| Mooney viscosity @100° C. ML(1 + 4) | 100 | 100 | 100 | 95-110 | 95-110 | 95-110 |
| Mooney Scorch @ 135° C., T10, min | 100 | 100 | 100 | 95-110 | 95-110 | 95-110 |
| MDR, 0.5° Arc @ 160° C. | | | | | | |
| MH-ML | 100 | 100 | 100 | 95-110 | 95-110 | 95-110 |
| MH | 100 | 100 | 100 | 95-110 | 95-110 | 95-110 |
| ML | 100 | 100 | 100 | 95-110 | 95-110 | 95-110 |
| Ts2, min | 100 | 100 | 100 | 95-110 | 95-110 | 95-110 |
| Tc50, min | 100 | 100 | 100 | 95-110 | 95-110 | 95-110 |
| Tc90, min | 100 | 100 | 100 | 95-110 | 95-110 | 95-110 |
| Tensile, Cure— 8 mins @160° C. | | | | | | |
| Hardness @25° C. | 100 | 100 | 100 | 95-110 | 95-110 | 95-110 |
| 100% Modulus, MPa | 100 | 100 | 100 | 95-110 | 95-110 | 95-110 |
| 300% Modulus, MPa | 100 | 100 | 100 | 95-110 | 95-110 | 95-110 |
| Tensile, MPa | 100 | 100 | 100 | 95-110 | 95-110 | 95-110 |
| Elongation, % | 100 | 100 | 100 | 95-110 | 95-110 | 95-110 |
| Aged Tensile, 72 Hrs @125° C. | | | | | | |
| Hardness @25° C. | 100 | 100 | 100 | 95-110 | 95-110 | 95-110 |
| 100% Modulus, MPa | 100 | 100 | 100 | 95-110 | 95-110 | 95-110 |
| 300% Modulus, MPa | 100 | 100 | 100 | 95-110 | 95-110 | 95-110 |
| Tensile, MPa | 100 | 100 | 100 | 95-110 | 95-110 | 95-110 |
| Elongation, % | 100 | 100 | 100 | 95-110 | 95-110 | 95-110 |
| Die B Tear, N/mm | 100 | 100 | 100 | 95-110 | 95-110 | 95-110 |
| Die B Tear-Aged 72 Hrs @125° C. | 100 | 100 | 100 | 95-110 | 95-110 | 95-110 |
| Mocon @ 60° C. | 100 | 110 | 125 | 95-110 | 120 | 150 |

Examples

Example 5

The present invention is the application of butyl rubber made according to the inventive synthetic steps described herein in a rubber compound whose composition is suitable for use as an innertube in bicycle, passenger car, truck, bus and other vehicles and available from ExxonMobil Chemical Company, Houston, Tex. While not meant to be limiting by, it may be better understood by reference to the following example compositions and Tables.

The characteristics of the butyl polymer made in accordance to the invention as well as the reference butyl polymer made using the commercial process are outlined in Table 14. The butyl polymer made in R-134a diluent (Butyl-HFC; Experimental) had slightly higher molecular weight and slightly lower isoprene content than the commercial Butyl 268 reference polymer made in MeCl (Control) and was well within the product specification of the commercial Butyl 268 (Mooney Viscosity 46-56) from ExxonMobil Chemical Company. The butyl polymer made in R-134a was essentially free of long chain branching while the conventional butyl polymer made in MeCl or hydrocarbon solvents all contained long chain branching as measured by GPC-3D analysis.

The example butyl polymer innertube compositions are mixed by techniques common in the art, the components and their relative amounts listed in Table 15. Particularly, the first pass of components is mixed at 77 rpm in a BANBURY™ size BR mixer (1.57 liter) using an 85% loading. The elastomer is added at time zero and a starting temperature of about 60° C. ⅔rd of the carbon black and zinc oxide are added at about 30 seconds of mixing, and ⅓rd of the carbon black, paraffinic oil (Flexon™ 876, ExxonMobil Chemical Company) and stearic acid are added after 90 seconds of mixing. After an additional 90 seconds of mixing, the mixer is scraped down. The mixture is dumped at a time about 300 seconds and a temperature about 145 to 156° C. The second pass components are mixed at 55 rpm in a BANBURY™ size BR mixer using a 75% loading. The first-pass masterbatch mixture and all remaining curative ingredients (sulfur, TMTD, MBTS) are added at time zero at a starting temperature of 50° C. After 60 seconds of mixing, the mixer is scraped down. The mixture is dumped at a time of about 120 seconds and a temperature of about 105 to 110° C. Samples are further processed on a 2-roll mill by using six crosscuts and six rolls of mill mixing before sheeting out.

Cure properties are measured using an ODR 2000 using a 3.0 degree arc at 180° C. for 60 minutes. Test specimens are cured at 180° C., for a time corresponding to $T_c90$+appropriate mold lag.

TABLE 15

Elastomeric Compositions

|  | Control 1 | Control 2 | Control 3 | Expt 1 | Expt 2 | Expt 3 | Expt 4 |
|---|---|---|---|---|---|---|---|
| Butyl 268—MeCl | 100 | 100 | 100 | — | — | — | — |
| Butyl 268—HFC | — | — | — | 100 | 100 | 100 | 100 |
| Carbon Black N660 | 70 | 70 | 70 | 70 | 70 | 70 | 70 |
| Paraffinic Oil—Medium Viscosity | 25 | 25 | 25 | 25 | 25 | 25 | 25 |
| Stearic Acid | 1 | 1 | 1 | 1 | 1 | 1 | 1 |
| ZnO | 5 | 5 | 5 | 5 | 5 | 5 | 5 |
| Sulfur | 2 | 2 | 2 | 2 | 2 | 2 | 2 |
| TMTD | 1 | 1 | 1 | 1 | 1 | 1 | 1 |
| MBTS | 0.5 | 0.5 | 0.5 | 0.5 | 0.5 | 0.5 | 0.5 |

TABLE 14

Butyl Rubber Characteristics

|  | Mooney Viscosity (ML 1 + 8, 125° C.) | Mn (GPC) | Mw (GPC) | Isoprene Content (FTIR) Mole % |
|---|---|---|---|---|
| Butyl—HFC | 53.5 | 187,300 | 666,200 | 1.63 |
| Butyl—MeCl | 51.5 | 156,200 | 612,600 | 1.73 |

The cure and physical property data in Table 16 show that the use of butyl rubber produced in R-134a diluent (Experimental 1-4) according to the present invention affords equivalent cure and physical properties to that of the innertube compound made with the commercial Butyl 268 reference butyl polymer produced in MeCl (Controls 1-3), while also maintaining the desirable processability properties as determined in the Mooney viscosity values and cure Ts2 scorch values.

TABLE 16

Cure and Physical Properties

|  | Control 1 | Control 2 | Control 3 | Expt 1 | Expt 2 | Expt 3 | Expt 4 |
|---|---|---|---|---|---|---|---|
| Polymer ML 1 + 8@125 C. | 51.4 | 50.8 | 51.3 | 51.4 | 52.4 | 52.2 | 52.7 |
| Polymer MRI | 3.6 | 3.7 | 3.7 | 3.5 | 3.5 | 3.5 | 3.5 |
| Compound ML | 49.0 | 48.6 | 49.4 | 47.4 | 47.3 | 48.1 | 47.8 |

TABLE 16-continued

| Cure and Physical Properties | | | | | | | |
|---|---|---|---|---|---|---|---|
| | Control 1 | Control 2 | Control 3 | Expt 1 | Expt 2 | Expt 3 | Expt 4 |
| 1 + 4@100 C. Cure Properties ODR, Arc +/−3°, 180° C. × 30 min. | | | | | | | |
| MH, dN · m | 53.9 | 54.0 | 55.0 | 50.1 | 51.3 | 51.4 | 51.4 |
| Ts2, min | 1.8 | 1.7 | 1.7 | 1.7 | 1.7 | 1.7 | 1.7 |
| Tc90, min | 8.4 | 7.7 | 8.2 | 7.6 | 7.5 | 7.1 | 7.4 |
| MDR, Arc +/−0.5°, 180° C. × 30 min | | | | | | | |
| MH, dN · m | 11.2 | 11.0 | 11.3 | 10.4 | 10.3 | 10.5 | 10.8 |
| Ts2, min | 1.4 | 1.4 | 1.4 | 1.4 | 1.4 | 1.4 | 1.4 |
| Tc90, min | 5.8 | 5.6 | 5.6 | 5.8 | 5.7 | 5.7 | 5.9 |
| Tensile Properties | | | | | | | |
| Hardness, Shore A | 53 | 53 | 53 | 51 | 52 | 51 | 52 |
| 100% Modulus, MPa | 1.7 | 1.7 | 1.8 | 1.5 | 1.6 | 1.5 | 1.7 |
| 300% Modulus, MPa | 5.5 | 5.5 | 5.7 | 5.0 | 5.1 | 5.0 | 5.6 |
| Tensile Strength, MPa | 10.6 | 11.0 | 11.2 | 11.2 | 11.5 | 11.1 | 11.8 |
| Elongation, % | 545 | 565 | 575 | 605 | 600 | 595 | 595 |

Example 6

The present invention is the application of butyl rubber made according to the inventive synthetic steps described herein in a rubber compound whose composition is suitable for use as a curing bladder or envelope for use in preparing cured tires for bicycle, passenger car, truck, bus and other vehicles, or for re-treading tires and available from Exxon-Mobil Chemical Company, Houston, Tex.

The example butyl polymer bladder compositions are mixed by techniques common in the art, the components and their relative amounts listed in Table 17. Particularly, the first pass of components is mixed at 77 rpm in a BANBURY™ size BR mixer (1.57 liter) using an 80% loading. The elastomers Neoprene W, DuPont de Nemours) are added at time zero at a starting temperature of about 65° C. ⅔rd of the carbon black is added at about 30 seconds of mixing, and ⅓rd of the carbon black, castor oil and SP-1045 resin (Schenectady Int.) are added after 90 seconds of mixing. After an additional 90 seconds of mixing, the mixer is scraped down. The mixture is dumped at a time about 450 to 510 seconds and a temperature about 174 to 180° C. The second pass components are mixed at 40 rpm in a BANBURY™ size BR mixer using a 70% loading. The first-pass masterbatch mixture and all remaining curative ingredients (sulfur, TMTD, MBTS) are added at time zero at a starting temperature of about 45 to 50° C. After 60 seconds of mixing, the mixer is scraped down. The mixture is dumped at a time of about 120 seconds and a temperature of about 109 to 114° C. Samples are further processed on a 2-roll mill by using six crosscuts and six rolls of mill mixing before sheeting out.

Cure properties are measured using an ODR 2000 using a 3.0 degree arc at 180° C. for 60 minutes. Test specimens are cured at 180° C., for a time corresponding to $T_c90$+appropriate mold lag.

TABLE 17

| Elastomeric Compositions | | | | | | | |
|---|---|---|---|---|---|---|---|
| | Control 4 | Control 5 | Control 6 | Expt 5 | Expt 6 | Expt 7 | Expt 8 |
| Butyl 268—MeCl | 100 | 100 | 100 | | | | |
| Butyl 268—HFC | | | | 100 | 100 | 100 | 100 |
| Chloroprene Rubber | 5 | 5 | 5 | 5 | 5 | 5 | 5 |
| Carbon Black N330 | 50 | 50 | 50 | 50 | 50 | 50 | 50 |
| Castor Oil | 5 | 5 | 5 | 5 | 5 | 5 | 5 |
| SP1045 | 10 | 10 | 10 | 10 | 10 | 10 | 10 |
| ZnO | 5 | 5 | 5 | 5 | 5 | 5 | 5 |

The cure and physical property data in Table 18 show that the use of butyl rubber made by the present invention (Experiments 5-8) affords equivalent cure and physical properties to the commercial butyl rubber (Controls 4-6), while also maintaining or improving upon the desirable processability properties as determined in the Mooney viscosity values and cure Ts2 scorch values.

TABLE 18

Cure and Physical Properties

|  | Control 4 | Control 5 | Control 6 | Expt 5 | Expt 6 | Expt 7 | Expt 8 |
|---|---|---|---|---|---|---|---|
| Raw Polymer ML 1 + 8@125 C. | 51.4 | 50.8 | 51.3 | 51.4 | 52.4 | 52.2 | 52.7 |
| Raw Polymer MRI | 3.6 | 3.7 | 3.7 | 3.5 | 3.5 | 3.5 | 3.5 |
| Compound (FMB) ML 1 + 4@100 C. | 77.3 | 77.9 | 77.6 | 70.8 | 73 | 73.4 | 74.1 |
| Cure Characteristics ODR, Arc +/− 3°, 180° C. × 60 min. | | | | | | | |
| MH, dN · m | 60.4 | 61.1 | 59.7 | 56.3 | 57.2 | 58.3 | 58.7 |
| Ts2, min | 3.8 | 3.8 | 3.7 | 3.8 | 3.7 | 3.6 | 3.6 |
| Tc90, min | 44.8 | 47.0 | 46.3 | 43.8 | 44.1 | 45.0 | 43.6 |
| MDR, Arc +/− 0.5°, 180° C. × 60 min | | | | | | | |
| MH, dN · m | 12.8 | 13.6 | 12.9 | 12.1 | 12.5 | 12.7 | 12.8 |
| Ts2, min | 5.1 | 4.9 | 5.0 | 4.9 | 4.7 | 4.8 | 4.8 |
| Tc90, min | 35.3 | 38.7 | 37.1 | 35.0 | 34.0 | 35.0 | 34.0 |
| Physical Properties | | | | | | | |
| Hardness, Shore A | 62.0 | 62.0 | 61.0 | 59.0 | 62.0 | 60.0 | 60.0 |
| 100% Modulus, MPa | 2.3 | 2.2 | 2.2 | 1.7 | 2.0 | 1.9 | 2.0 |
| 300% Modulus, MPa | 7.8 | 7.5 | 7.4 | 5.9 | 7.0 | 6.6 | 6.7 |
| Tensile Strength, MPa | 14.6 | 15.2 | 15.3 | 14.4 | 14.6 | 14.5 | 14.7 |
| Elongation, % | 570 | 625 | 615 | 640 | 590 | 600 | 625 |

Example 7

The present invention is the application of bromobutyl rubber made according to the inventive synthetic steps described herein in a rubber compound whose composition is suitable for use as an innerliner of tires for bicycle, passenger car, truck, bus, aircraft, farm and other vehicles and available from ExxonMobil Chemical Company, Houston, Tex.

Bromination of Butyl-MeCl and Butyl-HFC polymers (Table 14) was carried out in standard round bottomed flasks using 5 wt % butyl polymer solution in cyclohexane. In order to minimize free radical bromination, the reactor was completely shielded from light and a small amount (about 200 ppm based on polymer charge) of BHT free radical inhibitor was added in the polymer solution. A 10 wt % bromine solution in cyclohexane was prepared and transferred into a graduated addition funnel attached to the reactor. Desired amount of the bromine solution was then added dropwise into the polymer solution with vigorous agitation. The bromination reaction was quenched with excessive caustic solution 2-5 minutes after the bromine addition was completed. The excess caustic in the neutralized polymer solution was then washed with fresh water in separatory funnel several times. The brominated butyl polymer was isolated by solvent precipitation in methanol and then dried in vacuum oven at moderate temperature overnight.

The example bromobutyl rubber innerliner compositions are mixed by techniques common in the art, the components and their relative amounts listed in Table 19. Particularly, the first pass of components are mixed at 60 rpm in a BRA-BENDER™ PLASTI-CORDER mixer (0.05 liter) with the temperature control unit set at about 140° C. The elastomer and Struktol 40MS resin are added at time zero. ¾ of the carbon black is added at about 30 seconds of mixing. After an additional 60 seconds of mixing, the mixer is scraped down, and the remaining carbon black, oil and SP-1068 resin are added. After an additional 60 seconds of mixing, the mixer is scraped down again, and the mixture dumped at 240 seconds at a temperature of about 145 to 155° C. Samples are finalized in a second pass at 40 rpm in a BRABENDER™ PLASTI-CORDER mixer with the temperature control unit set at about 40° C. The first pass masterbatch mixture and all cure ingredients are added at time zero. After an additional 60 seconds of mixing, the mixer is scraped down and the mixture dumped at 150 seconds at a maximum temperature of about 110° C. Samples are further processed on a 2-roll mill by using six crosscuts and six rolls of mill mixing before sheeting out.

TABLE 19

Elastomeric Compositions

|  | Control 7 | Control 8 | Expt 9 |
|---|---|---|---|
| Bromobutyl 2255 | 100 | | |
| Bromobutyl—MeCl | | 100 | |
| Bromobutyl—HFC | | | 100 |
| Struktol 40MS Resin | 7 | 7 | 7 |
| Carbon Black, N660 | 60 | 60 | 60 |
| SP-1068 Resin | 4 | 4 | 4 |
| Processing Oil, Calsol 810 | 8 | 8 | 8 |
| Stearic acid | 1 | 1 | 1 |
| Zinc Oxide, Kadox 911 | 1 | 1 | 1 |
| Sulfur | 0.5 | 0.5 | 0.5 |
| MBTS | 1.25 | 1.25 | 1.25 |

The data in Table 20 show that the use of bromobutyl rubber made by the present invention (Experiment 9) affords improved air barrier qualities compared to current commercial Bromobutyl 2255 (Control 7) or the bromobutyl rubber made with MeCl diluent (Control 8). The cure and physical properties of Experiment 9 are comparable to the bromobutyl rubber made with MeCl diluent (Control 8).

TABLE 20

Cure and Physical Properties

|  | Control 7 | Control 8 | Expt 9 |
|---|---|---|---|
| Compound ML 1 + 4@100° C. | 63.1 | 63.8 | 77.8 |
| Mooney Scorch @135 C., T5 | 11.26 | 4.10 | 2.69 |
| Cure Characteristics |  |  |  |
| MDR, Arc +/− 0.5, 160 C. × 30 min |  |  |  |
| ML, dN · m | 1.85 | 1.91 | 2.33 |
| MH, dN · m | 5.46 | 5.11 | 5.54 |
| Ts2, min | 4.10 | 1.09 | 0.96 |
| Tc50, min | 3.77 | 0.95 | 0.88 |
| Tc90, min | 9.30 | 1.87 | 1.27 |
| Physical Properties |  |  |  |
| Hardness, Shore A | 46 | 46 | 46 |
| 20% Modulus, MPa | 0.442 | 0.471 | 0.496 |
| 100% Modulus, MPa | 0.871 | 0.990 | 1.280 |
| 300% Modulus, MPa | 3.250 | 3.749 | 5.788 |
| Tensile, MPa | 9.556 | 10.130 | 10.950 |
| Elongation, % | 723 | 766 | 661 |
| Energy to break, N/mm | 9.417 | 12.052 | 11.743 |
| Air Permeability |  |  |  |
| MOCON cc*mm/(m$^2$-day-mmHg) | 0.7260 | 0.7339 | 0.7048 |

The example bromobutyl rubber compositions containing a nanoclay are mixed by techniques common in the art, the components and their relative amounts listed in Table 21. Particularly, the first pass of components are mixed at 60 rpm in a BRABENDER™ PLASTI-CORDER mixer (0.05 liter) with the temperature control unit set at about 140° C. The elastomer and Struktol 40MS resin are added at time zero. ¾ of the carbon black and the nanoclay are added at about 30 seconds of mixing. After an additional 60 seconds of mixing, the mixer is scraped down, and the remaining carbon black, oil and SP-1068 resin are added. After an additional 60 seconds of mixing, the mixer is scraped down again and the mixture dumped at 240 seconds at a temperature of about 145 to 155° C. Samples are finalized in a second pass at 40 rpm in a BRABENDER™ PLASTI-CORDER mixer with the temperature control unit set at about 40° C. The first pass masterbatch mixture and all cure ingredients are added at time zero. After an additional 60 seconds of mixing, the mixer is scraped down and the mixture dumped at 150 seconds at a maximum temperature of about 110° C. Samples are further processed on a 2-roll mill by using six crosscuts and six rolls of mill mixing before sheeting out.

TABLE 21

Elastomeric Compositions

|  | Control 7 | Control 9 | Control 8 | Control 10 | Expt 9 | Expt 10 |
|---|---|---|---|---|---|---|
| Bromobutyl 2255 | 100 | 100 |  |  |  |  |
| Bromobutyl—MeCl |  |  | 100 | 100 |  |  |
| Bromobutyl—HFC |  |  |  |  | 100 | 100 |
| Struktol 40MS | 7 | 7 | 7 | 7 | 7 | 7 |
| Carbon Black, N660 | 60 | 60 | 60 | 60 | 60 | 60 |
| Nanoclay, Closite 20A |  | 5 |  | 5 |  | 5 |
| SP-1068 | 4 | 4 | 4 | 4 | 4 | 4 |
| Processing Oil, Calsol 810 | 8 | 8 | 8 | 8 | 8 | 8 |
| Stearic acid | 1 | 1 | 1 | 1 | 1 | 1 |
| Zinc Oxide, Kadox 911 | 1 | 1 | 1 | 1 | 1 | 1 |
| Sulfur | 0.5 | 0.5 | 0.5 | 0.5 | 0.5 | 0.5 |
| MBTS | 1.25 | 1.25 | 1.25 | 1.25 | 1.25 | 1.25 |

Example 8

The present invention is the application of bromobutyl rubber made according to the inventive synthetic steps described herein in a rubber compound whose composition is suitable for use as an innerliner of tires for bicycle, passenger car, truck, bus, aircraft, farm and other vehicles and available from ExxonMobil Chemical Company, Houston, Tex.

The data in Table 22 show that the use of bromobutyl rubber made by the present invention containing a nanoclay (Experiment 10) can afford equivalent or even improved air barrier qualities compared to current commercial Bromobutyl 2255 (ExxonMobil Chemical, Mooney Viscosity 41-51) containing a nanoclay (Control 9) or the bromobutyl rubber made with MeCl diluent containing a nanoclay (Control 10) as well as maintaining the desirable physical properties. Additionally, the cure properties of Experimental 10 are equivalent compared to the bromobutyl rubber made with MeCl diluent (Control 10).

TABLE 22

Cure and Physical Properties

|  | Control 7 | Control 9 | Control 8 | Control 10 | Expt 9 | Expt 10 |
|---|---|---|---|---|---|---|
| Compound ML 1 + 4@100° C. | 63.1 | 68.1 | 63.8 | 63.9 | 77.8 | 77.8 |
| Mooney Scorch @135 C., T5 | 11.26 | 10.73 | 4.10 | 4.38 | 2.69 | 2.78 |

TABLE 22-continued

Cure and Physical Properties

|  | Control 7 | Control 9 | Control 8 | Control 10 | Expt 9 | Expt 10 |
|---|---|---|---|---|---|---|
| Cure Characteristics MDR, Arc +/− 0.5, 160 C. × 30 min |  |  |  |  |  |  |
| ML, dN · m | 1.85 | 1.95 | 1.91 | 1.94 | 2.33 | 2.35 |
| MH, dN · m | 5.46 | 5.83 | 5.11 | 5.42 | 5.54 | 6.02 |
| Ts2, min | 4.10 | 3.73 | 1.09 | 1.11 | 0.96 | 0.94 |
| Tc50, min | 3.77 | 3.63 | 0.95 | 1.01 | 0.88 | 0.90 |
| Tc90, min | 9.30 | 8.77 | 1.87 | 2.68 | 1.27 | 1.47 |
| Physical Properties |  |  |  |  |  |  |
| Hardness, Shore A | 46 | 48 | 46 | 46 | 46 | 47 |
| 20% Modulus, MPa | 0.442 | 0.493 | 0.471 | 0.456 | 0.496 | 0.526 |
| 100% Modulus, MPa | 0.871 | 0.941 | 0.990 | 0.982 | 1.280 | 1.519 |
| 300% Modulus, MPa | 3.250 | 3.554 | 3.749 | 3.755 | 5.788 | 6.936 |
| Tensile, MPa | 90.556 | 9.984 | 10.130 | 10.134 | 10.950 | 10.930 |
| Elongation, % | 723 | 760 | 766 | 748 | 661 | 546 |
| Energy to break, N/mm | 9.417 | 11.480 | 12.052 | 11.709 | 11.743 | 10.168 |
| Air Permeability |  |  |  |  |  |  |
| MOCON cc*mm/(m$^2$-day-mmHg) | 0.7260 | 0.7175 | 0.7339 | 0.7172 | 0.7048 | 0.7058 |

Example 9

The present invention is the application of bromobutyl rubber made according to the inventive synthetic steps described herein in a rubber compound whose composition is suitable for use as an innerliner of tires for bicycle, passenger car, truck, bus, aircraft, farm and other vehicles and available from ExxonMobil Chemical Company, Houston, Tex.

The example bromobutyl rubber compositions containing a polybutene processing aid are mixed by techniques common in the art, the components and their relative amounts listed in Table 23. Particularly, the first pass of components are mixed at 60 rpm in a BRABENDER™ PLASTI-CORDER mixer (0.05 liter) with the temperature control unit set at about 140° C. The elastomer and Struktol 40MS resin are added at time zero. ¾ of the carbon black is added at about 30 seconds of mixing. After an additional 60 seconds of mixing, the mixer is scraped down, and the remaining carbon black, oil or polybutene processing aid and SP-1068 resin are added. After an additional 60 seconds of mixing, the mixer is scraped down again and the mixture dumped at 240 seconds at a temperature of about 145 to 155° C. Samples are finalized in a second pass at 40 rpm in a BRABENDER™ PLASTI-CORDER mixer with the temperature control unit set at about 40° C. The first pass masterbatch mixture and all cure ingredients are added at time zero. After an additional 60 seconds of mixing, the mixer is scraped down and the mixture dumped at 150 seconds at a maximum temperature of about 110° C. Samples are further processed on a 2-roll mill by using six crosscuts and six rolls of mill mixing before sheeting out.

TABLE 23

Elastomeric Compositions

|  | Control 7 | Control 11 | Control 8 | Control 12 | Expt 9 | Expt 11 |
|---|---|---|---|---|---|---|
| Bromobutyl 2255 | 100 | 100 |  |  |  |  |
| Bromobutyl—MeCl |  |  | 100 | 100 |  |  |
| Bromobutyl—HFC |  |  |  |  | 100 | 100 |
| Struktol 40MS | 7 | 7 | 7 | 7 | 7 | 7 |
| Carbon Black, N660 | 60 | 60 | 60 | 60 | 60 | 60 |
| SP-1068 | 4 | 4 | 4 | 4 | 4 | 4 |
| Processing Oil, Calsol 810 | 8 |  | 8 |  | 8 |  |
| Polybutene, Parapol 2400 |  | 8 |  | 8 |  | 8 |
| Stearic acid | 1 | 1 | 1 | 1 | 1 | 1 |
| Zinc Oxide, Kadox 911 | 1 | 1 | 1 | 1 | 1 | 1 |
| Sulfur | 0.5 | 0.5 | 0.5 | 0.5 | 0.5 | 0.5 |
| MBTS | 1.25 | 1.25 | 1.25 | 1.25 | 1.25 | 1.25 |

The data in Table 24 show that the use of bromobutyl rubber made by the present invention when used with a polybutene processing aid (Experiment 11) can afford equivalent or even improved air barrier qualities compared to current commercial Bromobutyl 2255 with a polybutene processing aid (Control 11) or the bromobutyl rubber made with MeCl diluent and containing a polybutene processing aid (Control 12). Use of the polybutene processing aid in place of the oil improved air barrier qualities, Compare Controls 11 and 12 and Experiment 11, to Controls 7 and 8 and Experiment 9, respectively. Additionally, the cure and physical properties of Experimental 11 are equivalent when compared to the bromobutyl rubber made with MeCl diluent (Control 12).

TABLE 24

Cure and Physical Properties

|  | Control 7 | Control 11 | Control 8 | Control 12 | Expt 9 | Expt 11 |
|---|---|---|---|---|---|---|
| Compound ML 1 + 4@100° C. | 63.1 | 65.3 | 63.8 | 62.8 | 77.8 | 74.1 |
| Mooney Scorch @135 C., T5 | 11.26 | 11.40 | 4.10 | 6.89 | 2.69 | 5.11 |
| Cure Characteristics | | | | | | |
| MDR, Arc +/− 0.5, 160 C. × 30 min | | | | | | |
| ML, dN·m | 1.85 | 2.03 | 1.91 | 2.06 | 2.33 | 2.34 |
| MH, dN·m | 5.46 | 5.95 | 5.11 | 5.24 | 5.54 | 5.31 |
| Ts2, min | 4.10 | 5.74 | 1.09 | 2.27 | 0.96 | 1.94 |
| Tc50, min | 3.77 | 5.65 | 0.95 | 1.94 | 0.88 | 1.66 |
| Tc90, min | 9.30 | 11.92 | 1.87 | 3.86 | 1.27 | 2.52 |
| Physical Properties | | | | | | |
| Hardness, Shore A | 46 | 50 | 46 | 48 | 46 | 49 |
| 20% Modulus, MPa | 0.442 | 0.584 | 0.471 | 0.522 | 0.496 | 0.547 |
| 100% Modulus, MPa | 0.871 | 1.160 | 0.990 | 1.047 | 1.280 | 1.447 |
| 300% Modulus, MPa | 3.250 | 4.238 | 3.749 | 3.361 | 5.788 | 6.284 |
| Tensile, MPa | 90.556 | 11.604 | 10.130 | 10.003 | 10.950 | 11.492 |
| Elongation, % | 723 | 773 | 766 | 749 | 661 | 632 |
| Energy to break, N/mm | 9.417 | 13.569 | 12.052 | 11.010 | 11.743 | 12.316 |
| Air Permeability | | | | | | |
| MOCON cc*mm/(m$^2$-day-mmHg) | 0.7260 | 0.5548 | 0.7339 | 0.5352 | 0.7048 | 0.5415 |

Example 10

The present invention is the application of bromobutyl rubber made according to the inventive synthetic steps described herein in a rubber compound whose composition is suitable for use as an innerliner of tires for bicycle, passenger car, truck, bus, aircraft, farm and other vehicles and available from ExxonMobil Chemical Company, Houston, Tex.

The example bromobutyl rubber compositions containing a polybutene processing aid and a nanoclay are mixed by techniques common in the art, the components and their relative amounts listed in Table 25. Particularly, the first pass of components are mixed at 60 rpm in a BRABENDER™ PLASTI-CORDER mixer (0.05 liter) with the temperature control unit set at about 140° C. The elastomer and Struktol 40MS resin are added at time zero. ¾ of the carbon black and the nanoclay are added at about 30 seconds of mixing. After an additional 60 seconds of mixing, the mixer is scraped down, and the remaining carbon black, oil or polybutene processing aid and SP-1068 resin are added. After an additional 60 seconds of mixing, the mixer is scraped down again and the mixture dumped at 240 seconds at a temperature of about 145 to 155° C. Samples are finalized in a second pass at 40 rpm in a BRABENDER™ PLASTI-CORDER mixer with the temperature control unit set at about 40° C. The first pass masterbatch mixture and all cure ingredients are added at time zero. After an additional 60 seconds of mixing, the mixer is scraped down and the mixture dumped at 150 seconds at a maximum temperature of about 110° C. Samples are further processed on a 2-roll mill by using six crosscuts and six rolls of mill mixing before sheeting out.

TABLE 25

Elastomeric Compositions

|  | Control 7 | Control 13 | Control 8 | Control 14 | Expt 9 | Expt 12 |
|---|---|---|---|---|---|---|
| Bromobutyl 2255 | 100 | 100 | | | | |
| Bromobutyl—MeCl | | | 100 | 100 | | |
| Bromobutyl—HFC | | | | | 100 | 100 |
| Struktol 40MS | 7 | 7 | 7 | 7 | 7 | 7 |
| Carbon Black, N660 | 60 | 60 | 60 | 60 | 60 | 45 |
| Nanoclay, Closite 20A | | 5 | | 5 | | 5 |
| SP-1068 | 4 | 4 | 4 | 4 | 4 | 4 |
| Processing Oil, Calsol 810 | 8 | | 8 | | 8 | |
| Polybutene, Parapol 2400 | | 8 | | 8 | | 8 |
| Stearic acid | 1 | 1 | 1 | 1 | 1 | 1 |
| Zinc Oxide, Kadox 911 | 1 | 1 | 1 | 1 | 1 | 1 |
| Sulfur | 0.5 | 0.5 | 0.5 | 0.5 | 0.5 | 0.5 |
| MBTS | 1.25 | 1.25 | 1.25 | 1.25 | 1.25 | 1.25 |

The data in Table 26 show that the use of bromobutyl rubber made by the present invention (Experiment 12) when used with a polybutene processing aid and a nanoclay afford equivalent or even improved air barrier qualities compared to current commercial Bromobutyl 2255 (Control 13) or the bromobutyl rubber made with MeCl diluent (Control 14). The cure and physical properties of Experimental 12 are comparable to the bromobutyl rubber made with MeCl diluent (Control 14).

TABLE 26

| | Cure and Physical Properties | | | | | |
|---|---|---|---|---|---|---|
| | Control 7 | Control 13 | Control 8 | Control 14 | Expt 9 | Expt 12 |
| Compound ML 1 + 4@100° C. | 63.1 | 63.4 | 63.8 | 64.7 | 77.8 | 73.8 |
| Mooney Scorch @135 C., T5 | 11.26 | 11.46 | 4.10 | 7.07 | 2.69 | 4.98 |
| Cure Characteristics | | | | | | |
| MDR, Arc +/− 0.5, 160 C. × 30 min | | | | | | |
| ML, dN · m | 1.85 | 2.00 | 1.91 | 2.08 | 2.33 | 2.33 |
| MH, dN · m | 5.46 | 5.74 | 5.11 | 5.74 | 5.54 | 5.38 |
| Ts2, min | 4.10 | 6.15 | 1.09 | 2.36 | 0.96 | 1.98 |
| Tc50, min | 3.77 | 5.76 | 0.95 | 2.20 | 0.88 | 1.72 |
| Tc90, min | 9.30 | 11.76 | 1.87 | 5.75 | 1.27 | 2.65 |
| Physical Properties | | | | | | |
| Hardness, Shore A | 46 | 50 | 46 | 48 | 46 | 48 |
| 20% Modulus, MPa | 0.442 | 0.577 | 0.471 | 0.561 | 0.496 | 0.578 |
| 100% Modulus, MPa | 0.871 | 1.162 | 0.990 | 1.087 | 1.280 | 1.573 |
| 300% Modulus, MPa | 3.250 | 4.332 | 3.749 | 3.530 | 5.788 | 6.771 |
| Tensile, MPa | 90.556 | 11.813 | 10.130 | 10.291 | 10.950 | 11.968 |
| Elongation, % | 723 | 442 | 766 | 768 | 661 | 630 |
| Energy to break, N/mm | 9.417 | 13.748 | 12.052 | 12.015 | 11.743 | 12.483 |
| Air Permeability | | | | | | |
| MOCON cc*mm/(m$^2$-day-mmHg) | 0.7260 | 0.5601 | 0.7339 | 0.5372 | 0.7048 | 0.5245 |

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A cured elastomeric composition comprising:
   i. a copolymer comprising an isoolefin and a multiolefin,
   ii. the copolymer having a g'$_{vis.avg.}$ from greater than or equal to 0.978 as determined by triple detection SEC.

2. The cured elastomeric composition of claim 1, wherein the copolymer has no long chain branching.

3. The cured elastomeric composition of claim 1, wherein the multiolefin is a conjugated diene.

4. The cured elastomeric composition of claim 1, wherein the multiolefin content is greater than 0.5 mol% based on the total moles of said isoolefin and said multiolefin in the copolymer.

5. The cured elastomeric composition of claim 1, wherein the isoolefin comprises isobutylene.

6. The cured elastomeric composition of claim 1, wherein the copolymer is halogenated to form a halogenated copolymer.

7. The cured elastomeric composition of claim 6, wherein the halogenated copolymer is halogenated with chlorine or bromine.

8. The cured elastomeric composition of claim 6, wherein the halogen content is greater than 0.5 wt% based upon the weight of the halogenated copolymer.

9. The cured elastomeric composition of claim 1, wherein the copolymer has a MWD greater than 2.

10. The cured elastomeric composition of claim 1, wherein the copolymer has a copolymer sequence distribution defined by:

$$F = mA / (1 + mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is greater than 1.5 or m is from 1.10 to 1.25; and wherein m is defined by solving said equation.

11. The cured elastomeric composition of claim 10, wherein the copolymer has no long chain branching.

12. The cured elastomeric composition of claim 10, wherein the multiolefin is a conjugated diene.

13. The cured elastomeric composition of claim 10, wherein the multiolefin content is greater than 0.5 mol% based on the total moles of said isoolefin and said multiolefin in the copolymer.

14. The cured elastomeric composition of claim 10, wherein the isoolefin comprises isobutylene.

15. The cured elastomeric composition of claim 10, wherein the copolymer is halogenated to form a halogenated copolymer.

16. The cured elastomeric composition of claim 15, wherein the halogenated copolymer is halogenated with chlorine or bromine.

17. The cured elastomeric composition of claim 15, wherein the halogen content is greater than 0.5 wt% based upon the weight of the halogenated copolymer.

18. The cured elastomeric composition of claim 10, wherein the copolymer has a MWD greater than 2.

19. A method of using the cured elastomeric composition of claim 1, wherein the cured elastomeric composition is formed as an air membrane.

20. An article comprising the cured elastomeric composition of claim 1.

21. The article of claim 20, wherein the article is an air membrane.

22. The cured elastomeric composition of claim 1, wherein the isoolefin is isobutylene and the multiolefin is alkylstyrene.

23. The cured elastomeric composition of claim 22, wherein the alkylstyrene content is greater than 0.5 mol% based on the total moles of said isoolefin and said alkylstyrene in the copolymer.

24. The cured elastomeric composition of claim 1, wherein the copolymer has a MWD less than 3.

25. The cured elastomeric composition of claim 1, wherein the copolymer has a Mw greater than 50,000.

26. The cured elastomeric composition of claim 1, wherein the copolymer has a Mooney viscosity at least 20 ±5 (ML 1+8 at 125° C., ASTM D 1646).

27. The cured elastomeric composition of claim 1, wherein the cured elastomeric composition further comprises a blend comprising at least one of natural rubber, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPR), ethylene-propylene-diene rubber (EPDM), polysulfide, isobutylene/cyclopentadiene copolymer rubber, isobutylene/methyl cyclopentadiene copolymer rubber, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-α-methylstyrene) halogenated poly(isobutylene-co-isoprene-co-α-methylstyrene), or mixtures thereof.

28. The cured elastomeric composition of claim 1, wherein the cured elastomeric composition further comprises a filler, wherein the filler comprises carbon black, modified carbon black, silicates, carbonates, clay, exfoliated clay, clay treated with organic molecules, or mixtures thereof.

29. The cured elastomeric composition of claim 1, wherein in the cured elastomeric composition comprises a processing aid.

30. The cured elastomeric composition of claim 29, wherein the processing aid is selected from a group consisting of a mineral oil, a polybutene processing aid, a plastomer, paraffinic oils, and mixtures thereof, wherein the plastomer comprises ethylene derived units and from 10 wt% to 30 wt% of $C_3$ to $C_{10}$ α-olefin derived units based on the weight of the plastomer.

31. The cured elastomeric composition of claim 1, where the cured elastomeric composition is cured with a curative selected from sulfur, sulfur-based compounds, metal oxides, metal oxide complexes, fatty acids, peroxides, diamines, or mixtures thereof.

* * * * *

UNITED STATES PATENT AND TRADEMARK OFFICE
CERTIFICATE OF CORRECTION

| | |
|---|---|
| PATENT NO. | : 7,659,355 B2 |
| APPLICATION NO. | : 11/628591 |
| DATED | : February 9, 2010 |
| INVENTOR(S) | : Waddell et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this

Thirtieth Day of November, 2010

David J. Kappos
*Director of the United States Patent and Trademark Office*